(12) United States Patent
Murata

(10) Patent No.: US 9,109,695 B2
(45) Date of Patent: Aug. 18, 2015

(54) FLUID TRANSMISSION DEVICE

(75) Inventor: Kiyohito Murata, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 64 days.

(21) Appl. No.: 13/503,958

(22) PCT Filed: Nov. 16, 2009

(86) PCT No.: PCT/JP2009/006134
§ 371 (c)(1),
(2), (4) Date: Apr. 25, 2012

(87) PCT Pub. No.: WO2011/058616
PCT Pub. Date: May 19, 2011

(65) Prior Publication Data
US 2012/0221219 A1    Aug. 30, 2012

(51) Int. Cl.
*G06F 7/00* (2006.01)
*G06F 17/00* (2006.01)
*G06F 19/00* (2011.01)
*F16H 61/14* (2006.01)
*F02D 23/00* (2006.01)
*F16H 59/32* (2006.01)
*F16H 59/66* (2006.01)

(52) U.S. Cl.
CPC ............ *F16H 61/143* (2013.01); *F16H 61/14* (2013.01); *F02D 23/00* (2013.01); *F16H 59/32* (2013.01); *F16H 59/66* (2013.01)

(58) Field of Classification Search
USPC ............ 701/60, 103, 110, 22, 48, 66, 93, 51, 701/55, 56; 192/3.29, 3.3; 303/150, 191; 477/107, 115, 168, 181, 33, 61, 77, 92, 477/45, 62, 154; 60/608, 611
See application file for complete search history.

(56) References Cited

U.S. PATENT DOCUMENTS 5,186,081 A * 2/1993 Richardson et al. ............ 477/33
6,056,667 A * 5/2000 Sasaki ............................ 477/174
(Continued)

FOREIGN PATENT DOCUMENTS

JP    1-121759 U    8/1989
JP    5-296337 A    11/1993
(Continued)

OTHER PUBLICATIONS

International Search Report for PCT/JP2009/006134 dated Dec. 28, 2009.

*Primary Examiner* — Tuan C. To
*Assistant Examiner* — Isaac Smith
(74) *Attorney, Agent, or Firm* — Sughrue Mion, PLLC

(57) ABSTRACT

A fluid transmission device includes a fluid transmission section capable of transmitting power transmitted to an input member to an output member via a working fluid, a lock-up clutch section capable of transmitting power transmitted to the input member to the output member via a friction engagement section, and a control unit configured to execute a torque ratio variable control that makes a torque ratio which is a ratio between torque output from the output member and torque input to the input member variable by adjusting a friction engagement state of the friction engagement section, when the fluid transmission section is in an operation state that the fluid transmission section amplifies torque input to the input member and outputs torque from the output member.

14 Claims, 11 Drawing Sheets

(56) References Cited

U.S. PATENT DOCUMENTS

| | | | |
|---|---|---|---|
| 6,264,581 B1 * | 7/2001 | Tashiro et al. | 477/154 |
| 7,357,233 B2 * | 4/2008 | Kos et al. | 192/3.29 |
| 2003/0199361 A1 * | 10/2003 | Tabata | 477/181 |
| 2009/0170650 A1 * | 7/2009 | Morimoto et al. | 475/121 |

FOREIGN PATENT DOCUMENTS

| | | | | |
|---|---|---|---|---|
| JP | 05296337 A | * | 11/1993 | |
| JP | 8-277932 A | | 10/1996 | |
| JP | 2004-353777 A | | 12/2004 | |
| JP | 2004353777 A | * | 12/2004 | |
| JP | 2005-121121 A | | 5/2005 | |
| JP | 2005121121 A | * | 5/2005 | |
| JP | 2005-325918 A | | 11/2005 | |
| JP | 2005325918 A | * | 11/2005 | |
| JP | 2006-22939 A | | 1/2006 | |
| JP | 2006022939 A | * | 1/2006 | |
| JP | 2006-101586 A | | 4/2006 | |
| JP | 2008-115901 A | | 5/2008 | |
| JP | 2008115901 A | * | 5/2008 | |
| JP | 2009-30775 A | | 2/2009 | |
| JP | 2009-228778 A | | 10/2009 | |
| JP | 2009228778 A | * | 10/2009 | |

* cited by examiner

FLUID TRANSMISSION DEVICE

CROSS REFERENCE TO RELATED APPLICATIONS

This application is a National Stage of International Application No. PCT/JP2009/06134 filed Nov. 16, 2009, the contents of which are incorporated herein by reference in their entirety.

FIELD

The present invention relates to a fluid transmission device, and more particularly to a fluid transmission device capable of transmitting power generated by a power source via a working fluid.

BACKGROUND

Conventionally, automatic transmissions mounted on a vehicle and the like uses, for example, a torque converter as a fluid transmission device to smoothly execute a shift of change of operation states such as start, stop and the like. The torque converter includes, for example, a fluid transmission mechanism, a lock-up clutch mechanism, and a damper mechanism. Then, the torque converter transmits power, which is transmitted from a power source (drive source) to a front cover when the lock-up clutch is turned OFF, to an output shaft (for example, an input shaft of a transmission) via a working oil as a working fluid in a fluid transmission mechanism, whereas the torque converter directly transmits a drive force, which is transmitted to the front cover when the lock-up clutch is turned ON, to the output shaft via an engagement member in the lock-up clutch mechanism without via the working fluid in the fluid transmission mechanism. At the time, the damper mechanism damps a vibration when the drive force is transmitted.

As the conventional fluid transmission device, a vehicle power transmission device described in, for example, Patent Literature 1 starts to engage a lock-up clutch at a time before an output of a turbo charger is increased and a boost thereof is increased by starting to engage the lock-up clutch when a speed ratio, which is a ratio of a turbine revolution number to a pump revolution number, is 0.7 or less in a vehicle power transmission device composed of a combination of a turbo engine and a fluid coupling provided with a lock-up clutch. With the operation, since the vehicle power transmission device can complete to engage the lock-up clutch before an engine revolution number and output torque are increased by the increase of the boost, the vehicle power transmission device can make a timing at which the lock-up clutch is engaged after a vehicle starts appropriate.

CITATION LIST

Patent Literature

Patent Literature 1: Japanese Patent Application Laid-open No. 2005-325918

SUMMARY

Technical Problem

Incidentally, in a vehicle to which the vehicle power transmission device disclosed in Patent Literature 1 as described above is applied, although there is a case that a fuel consumption is improved by, for example, downsizing a supercharged engine that is a power source, even in the case, it is desired to realize appropriate start performance in the vehicle power transmission device even in the case.

Accordingly, an object of the present invention is to provide a fluid transmission device capable of realizing appropriate start performance.

Solution to Problem

To achieve the above object, a fluid transmission device according to the present invention includes a fluid transmission section capable of transmitting power transmitted to an input member to an output member via a working fluid, a lock-up clutch section capable of transmitting power transmitted to the input member to the output member via a friction engagement section, and a control unit capable of executing a torque ratio variable control that makes a torque ratio which is a ratio between torque output from the output member and torque input to the input member variable by adjusting a friction engagement state of the friction engagement section, when the fluid transmission section is in an operation state that the fluid transmission section amplifies torque input to the input member and outputs torque from the output member.

Further, in the fluid transmission device, the control unit may be configured to adjust the friction engagement state of the friction engagement section based on a target value of the torque ratio variable control which is set in accordance with an operation state of a vehicle on which the fluid transmission section and the lock-up clutch section are mounted.

Further, in the fluid transmission device, the control unit may be configured to change the torque ratio in accordance with an allowable torque in a power transmission system to which the torque output from the output member is transmitted.

Further, in the fluid transmission device, a power source that generates power transmitted to the input member may be an internal combustion engine that is supercharged by a supercharger which increases pressure of intake air of an intake path making use of an exhaust gas, and the control unit may be configured to change the torque ratio in accordance with a supercharging delay.

Further, in the fluid transmission device, the control unit may be configured to change the torque ratio in accordance with a deviation between target engine torque that is assumed to be generated by the internal combustion engine when the supercharging is executed without the supercharging delay and actual engine torque actually generated by the internal combustion engine.

Further, in the fluid transmission device, a power source that generates power transmitted to the input member may be an internal combustion engine that is supercharged by a supercharger which increases pressure of intake air of an intake path making use of an exhaust gas, and the control unit may be configured to change the torque ratio in accordance with actual engine torque actually generated by the internal combustion engine, a gear shift stage or a gear shift ratio of a transmission to which torque output from the output member is transmitted, and a speed ratio which is a ratio between a rotational speed of the output member and a rotational speed of the input member.

Further, in the fluid transmission device, the actual engine torque may be configured to be calculated based on a throttle open degree of the internal combustion engine and an engine revolution number of the internal combustion engine, and the speed ratio may be configured to be calculated based on the gear shift stage or the gear shift ratio and a vehicle speed of a vehicle on which the fluid transmission section and the lock-up clutch section are mounted.

Further, in the fluid transmission device, a power source that generates power transmitted to the input member may be an internal combustion engine, and the control unit may be configured to predict a state of the internal combustion engine after a predetermined time based on a throttle open degree and an engine revolution number of the internal combustion engine, and changes the torque ratio in accordance with the predicted state of the internal combustion engine.

Further, in the fluid transmission device, the control unit may be configured to change the torque ratio in accordance with a tilt angle of a road surface on which a vehicle on which the fluid transmission section and the lock-up clutch section are mounted is positioned, or with a rudder angle of the vehicle.

Further, in the fluid transmission device, the control unit may be configured to adjust a pressure force acting between one friction surface and the other friction surface which constitute the friction engagement section by adjusting pressure of the working fluid in a hydraulic pressure chamber of the lock-up clutch section, adjusts a slip amount between the one friction surface and the other friction surface, and adjusts the torque ratio.

Further, in the fluid transmission device, the control unit may be configured to set a change speed of the pressure of the working fluid in accordance with a deviation between a target torque ratio which is a target torque ratio in the torque ratio variable control and an actual torque ratio.

Further, in the fluid transmission device, the control unit may be configured to set the pressure of the working fluid in accordance with a response delay of the pressure of the working fluid.

Further, in the fluid transmission device, when it is predicted that a stop state of a vehicle on which the fluid transmission section and the lock-up clutch section are mounted continues, the control unit may be configured to place the friction engagement section in a non-engaged state and to relatively lower a load of a power source which generates power transmitted to the input member in comparison with a case that a start of the vehicle is predicted.

Advantageous Effects of Invention

According to the fluid transmission device according to the present invention, appropriate start performance can be realized.

DESCRIPTION OF EMBODIMENTS

Embodiments of a fluid transmission device according to the present invention will be explained below in detail based on the drawings. Note that the present invention is not limited by the embodiments. Further, the components in the embodiments include components which can be replaced by a person skilled in the art as well as are easy or include substantially same components.

First Embodiment

Figure 1:
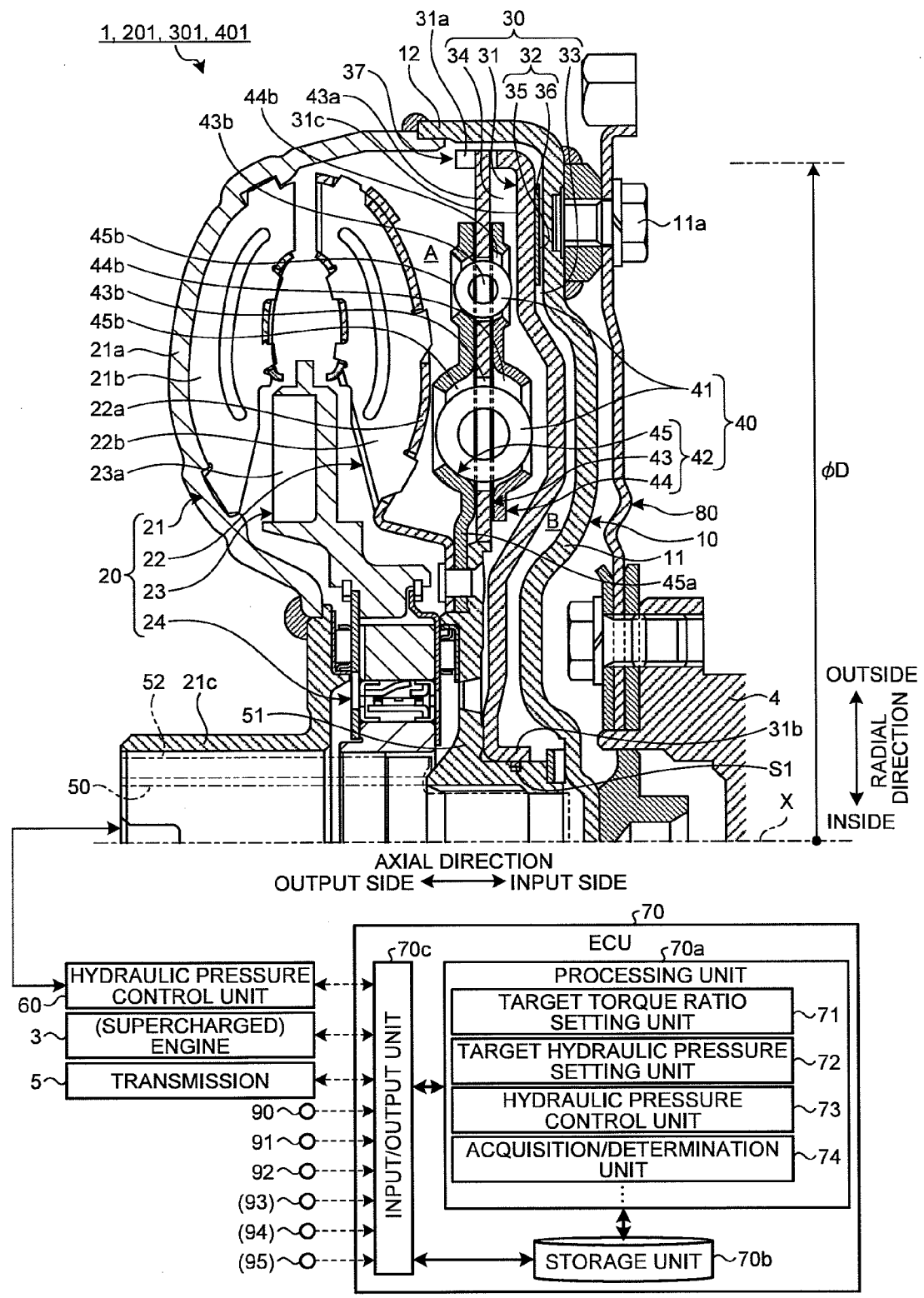
FIG. 1 is a main portion sectional view of a torque converter according to a first embodiment of the present invention.
Figure 2:
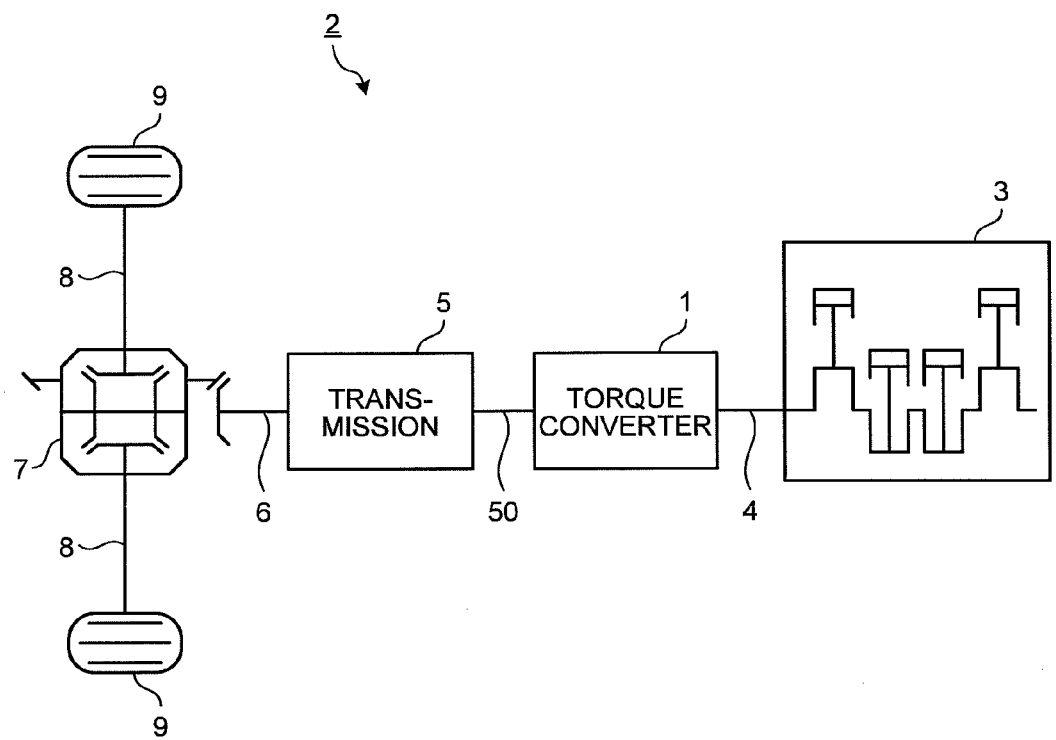
FIG. 2 is a view showing a schematic configuration example of a drive system of a vehicle to which the torque converter according to the first embodiment of the present invention is applied.
Figure 3:
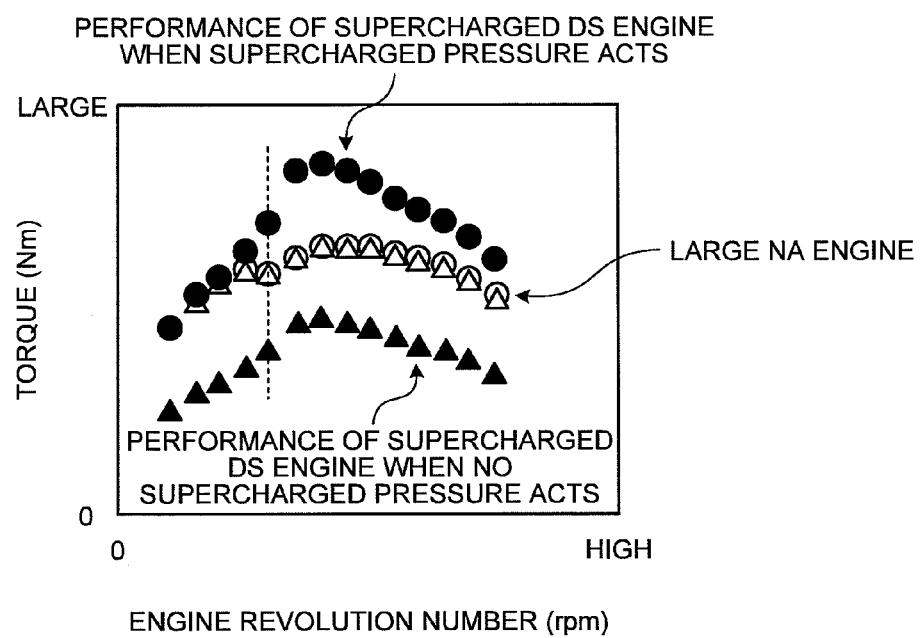
FIG. 3 is a view explaining an example of engine performance of the vehicle to which the torque converter according to the first embodiment of the present invention is applied.
Figure 4:
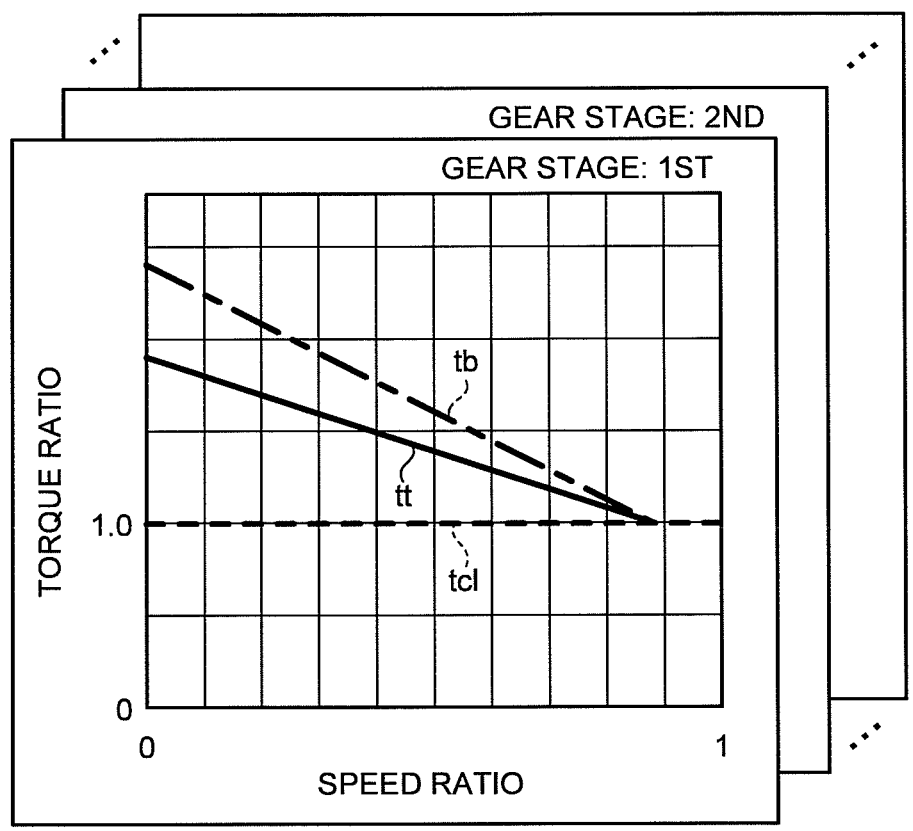
FIG. 4 is a target torque ratio maps of the torque converter according to the first embodiment of the present invention.
Figure 5:
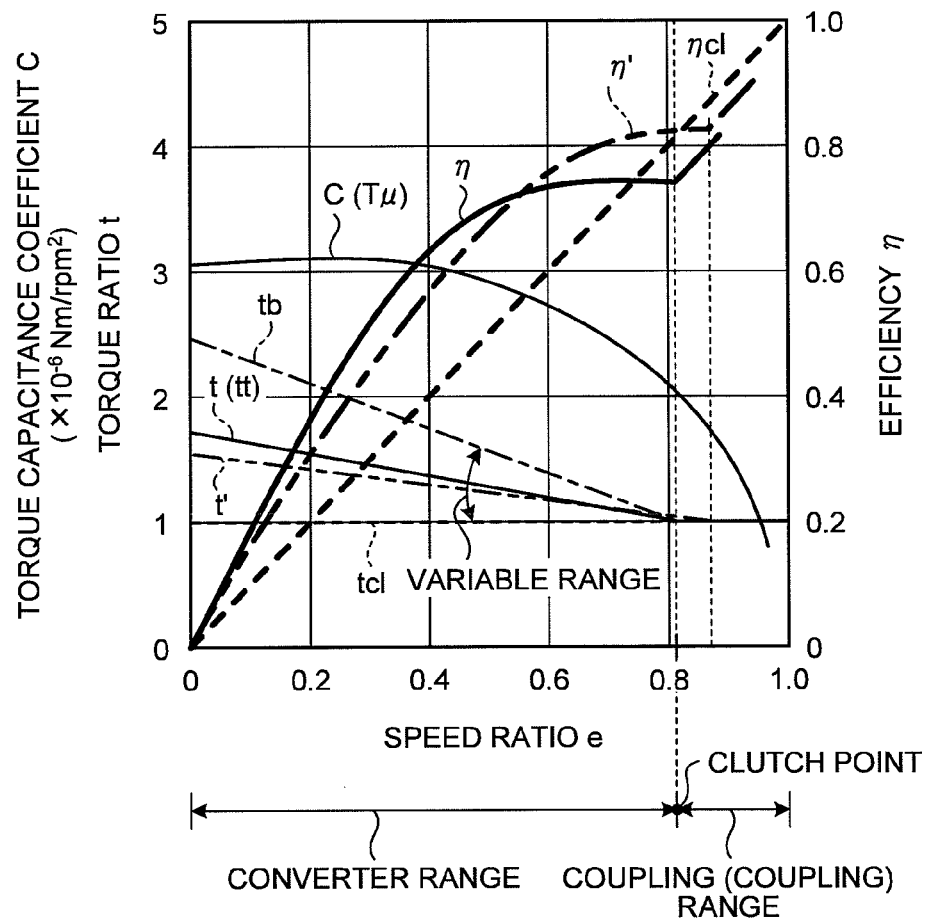
FIG. 5 is a graph explaining an example of performance of the torque converter according to the first embodiment of the present invention.
Figure 6:
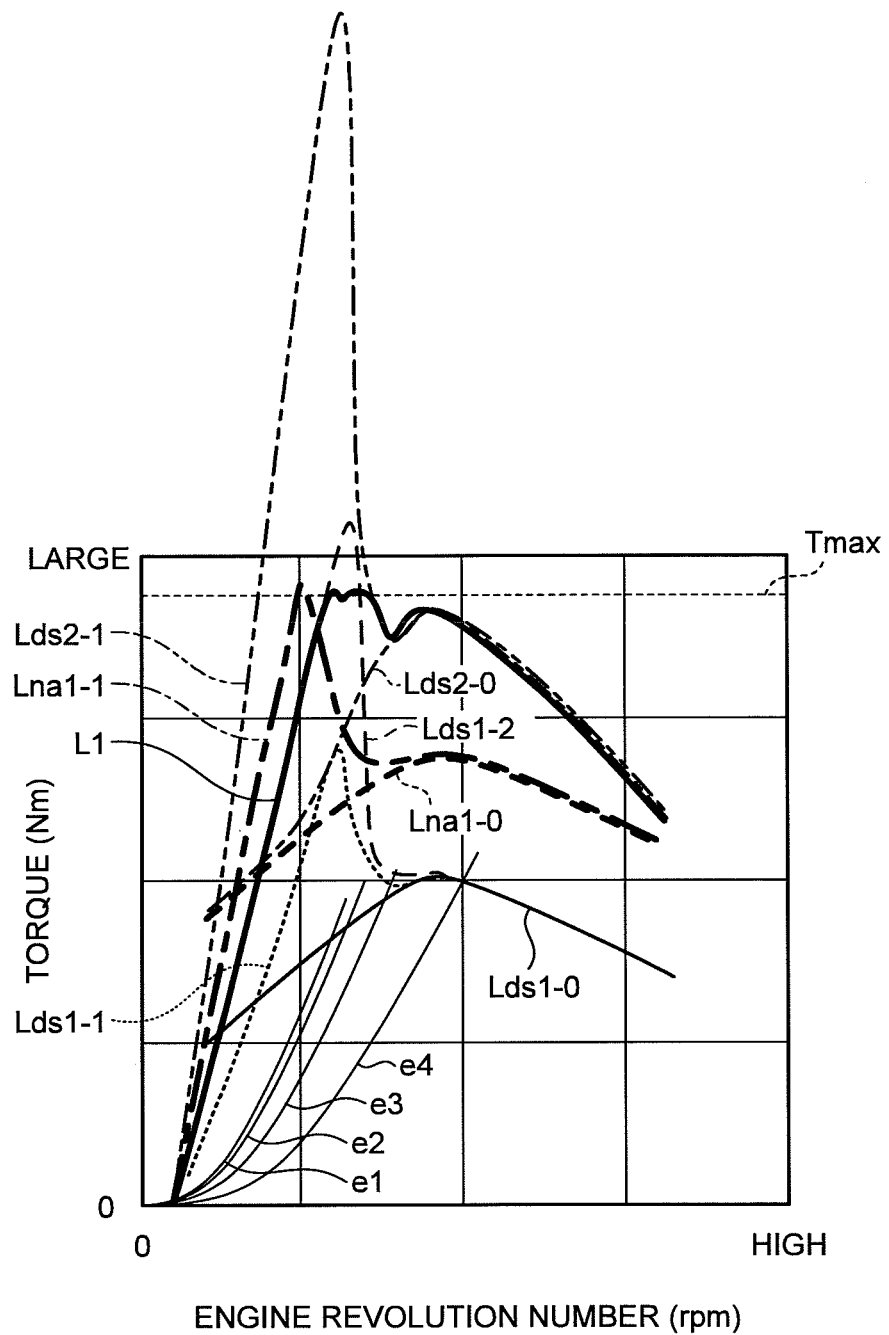
FIG. 6 is a graph explaining an example of start-time power performance of the vehicle to which the torque converter according to the first embodiment of the present invention is applied.
Figure 7:
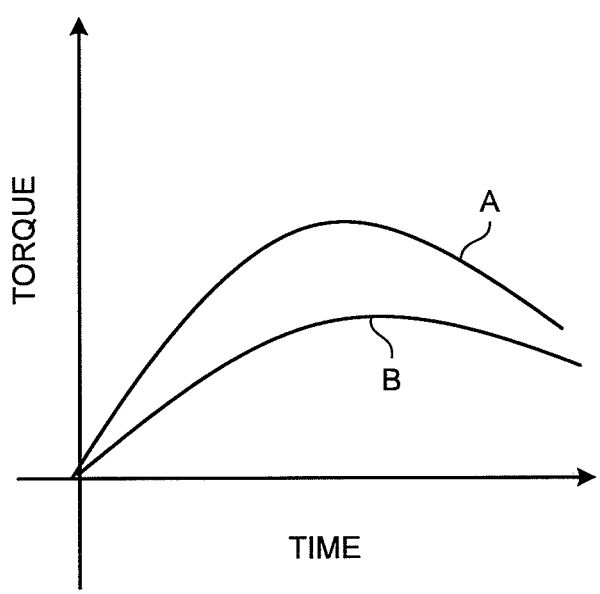
FIG. 7 is a graph explaining an example of drive torque when the vehicle, to which the torque converter according to the first embodiment of the present invention is applied, starts.
Figure 8:
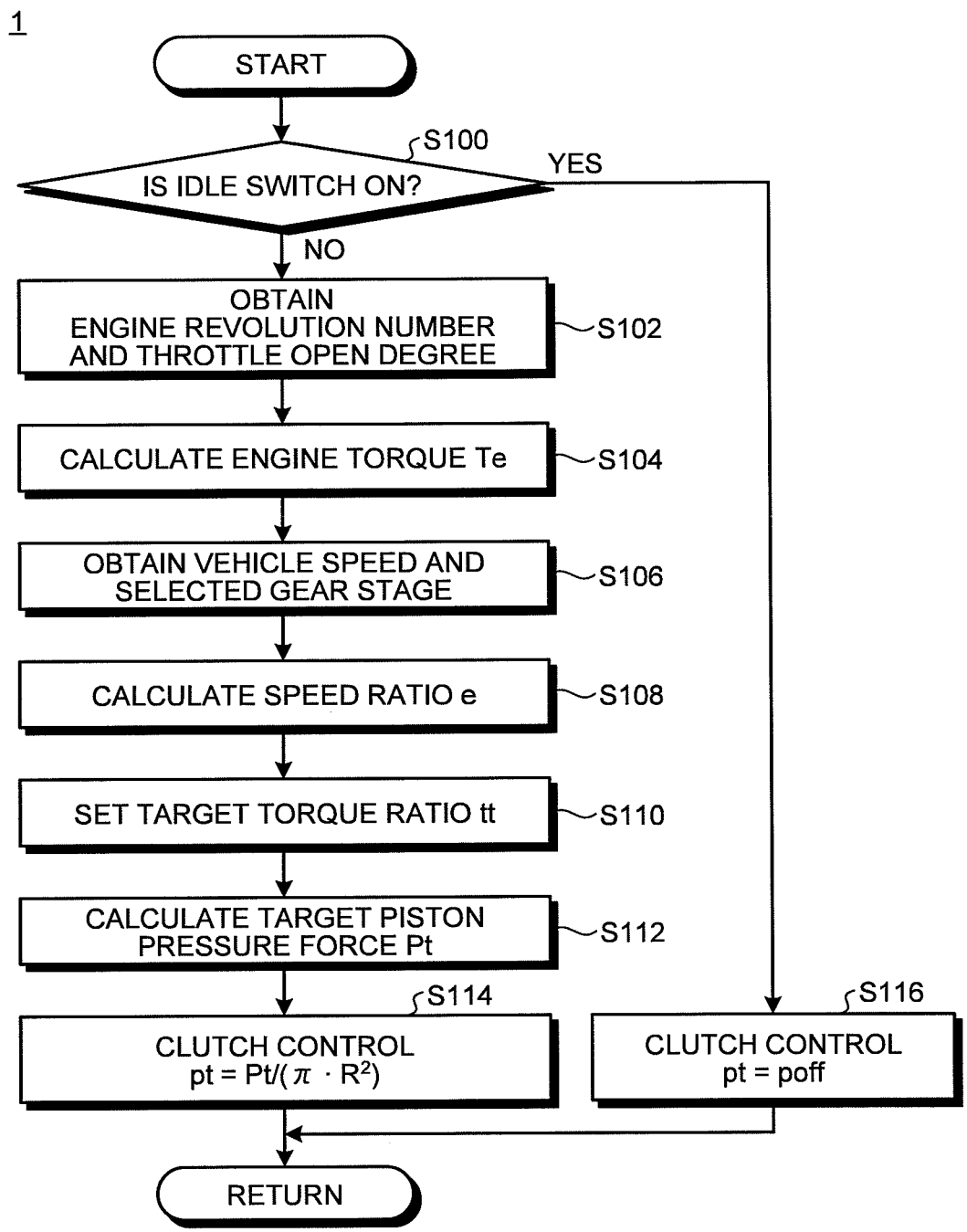
FIG. 8 is a flowchart explaining a torque ratio variable control of the torque converter according to the first embodiment of the present invention.

FIG. 1 is a main portion sectional view of a torque converter according to a first embodiment of the present invention, FIG. 2 is a view showing a schematic configuration example of a drive system of a vehicle to which the torque converter according to the first embodiment of the present invention is applied, FIG. 3 is a view explaining an example of engine performance of the vehicle to which the torque converter according to the first embodiment of the present invention is applied, FIG. 4 is a target torque ratio maps of the torque converter according to the first embodiment of the present invention, FIG. 5 is a graph explaining an example of performance of the torque converter according to the first embodiment of the present invention, FIG. 6 is a graph explaining an example of start-time power performance of the vehicle to which the torque converter according to the first embodiment of the present invention is applied, FIG. 7 is a graph explaining an example of drive torque when the vehicle, to which the torque converter according to the first embodiment of the present invention is applied, starts, and FIG. 8 is a flowchart explaining a torque ratio variable control of the torque converter according to the first embodiment of the present invention.

In the following explanation, since a torque converter 1 as the fluid transmission device is configured approximately symmetrically about a rotation axis X of an output shaft 50 shown in FIG. 1 as a central axis, FIG. 1 illustrates only one side using the rotation axis X as the central axis, only the one side is explained using the rotation axis X as the central axis unless otherwise described, and an explanation of the other side is omitted as much as possible. Further, in the following explanation, unless otherwise described, a direction along the rotation axis X is called an axial direction, a direction orthogonal to the rotation axis X, that is, a direction orthogonal to the axial direction is called a radial direction, and a direction around the rotation axis X is called a circumferential direction. Further, the rotation axis X side in a radial direction is called a radial direction inside, and an opposite side is called a radial direction outside. Further, a side in the axial direction where a power source is disposed (side to which power is input from the power source) is called an input side, and an opposite side, that is, a side where a transmission 5 is disposed (side from which power is output to the transmission 5) is called an output side. Note that the output shaft 50 is, for example, an input shaft of the transmission 5 disposed to an output side of the torque converter 1, and the like.

The torque converter 1 as the fluid transmission device shown in FIG. 1 is applied to a vehicle 2 on which a drive device, which is configured including an engine 3 as an internal combustion engine which is a travel power source, the transmission 5 and the like (refer to FIG. 2) is mounted. The torque converter 1 of the embodiment is interposed between the engine 3 and the transmission 5 in a power transmission path of the vehicle 2.

First, as shown in FIG. 2, the vehicle 2 to which the torque converter 1 is applied is mounted with the engine 3 as the internal combustion engine which is the power source that generates power at the time of travel. The engine 3 generates mechanical power (engine torque) to a crank shaft 4 which is the output shaft. The torque converter 1 is transmitted (output) with the mechanical power generated by the engine 3, in other words, with torque from the crank shaft 4 and transmits (inputs) the transmitted torque from the output shaft 50 to the transmission 5 after amplifying the transmitted torque or as it is. The transmission 5 changes rotational power transmitted from the output shaft 50 of the torque converter 1 (the input shaft of the transmission 5) at a gear shift stage or at a gear shift ratio suitable for an operation state of the vehicle 2 and transmits (outputs) the power after gear shifted from an output shaft 6 to a differential device 7. The differential device 7 distributes the power transmitted (input) from the output shaft 6 of the transmission 5 in two left and right directions and transmits (outputs) the power to respective drive shafts 8. The respective drive shafts 8 drive respective drive wheels 9 in rotation by the power transmitted (input) from the differential device 7. The vehicle 2 is configured such that the output torque of the engine 3 is transmitted to the respective drive wheels 9 via a power transmission system configured as described above.

Here, the engine 3 is a so-called supercharged engine which has, for example, a turbine and a compressor as well as is provided with a supercharger which executes supercharging by increasing a pressure (supercharged pressure) of intake air by obtaining energy of an exhaust gas of the engine 3 by the turbine and driving the compressor. Further, the transmission 5 is a so-called automatic transmission and may be a CVT (continuously variable transmission) which can steplessly (continuously) change a gear shift ratio which is a ratio of an input rotational speed being input and an output rotational speed output from the transmission 5 or may be an AT (automatic transmission) which change a gear shift ratio stepwise (discontinuously). Note that the travel power source of the vehicle 2 is not limited to the internal combustion engine and may be an electric machine such as a motor and the like or a combination of the internal combustion engine and the electric machine such as the motor and the like which are used together.

Next, as shown in FIG. 1, the torque converter 1 as the fluid transmission device according to the embodiment includes a front cover 10 as an input member, a fluid transmission mechanism 20 as a fluid transmission section, a lock-up clutch mechanism 30 as a lock-up clutch section, a damper mechanism 40 as a part of a damper section, the output shaft 50 as an output member, a hydraulic pressure control unit 60, and an ECU (electronic control unit) 70 as a control unit. In the torque converter 1, the front cover 10, the lock-up clutch mechanism 30, the damper mechanism 40, and the fluid transmission mechanism 20 are disposed in this order from an input side to an output side with respect to the axial direction.

The front cover 10 is the input member, is transmitted with the power from the engine 3 which is the power source, and transmits the transmitted power to the fluid transmission mechanism 20 or to the lock-up clutch mechanism 30. In the front cover 10, a front cover main body section 11 is formed in a disc shape coaxially with the rotation axis X which is the central axis of the output shaft 50, and a front cover flange section 12 is formed by projecting from an outside end section of the front cover main body section 11 in the radial direction to the output side. The front cover 10 is fastened (fixed) to a drive plate 80 by a bolt 11a and the like. Here, the drive plate 80 is formed is an annular plate shape coaxially with the rotation axis X which is the central axis of the output shaft 50, fastened (fixed) to the crank shaft 4, and can be rotated integrally with the crank shaft 4 about the rotation axis X. Accordingly, a rotational power of the engine 3 is transmitted from the crank shaft 4 to the front cover main body section 11 via the drive plate 80. With the operation, the front cover 10 can be rotated together with the crank shaft 4 about the rotation axis X.

The fluid transmission mechanism 20 is the fluid transmission section and transmits power transmitted to the front cover 10 to the output shaft 50 via a working oil as a working fluid. The fluid transmission mechanism 20 is composed of a pump impeller 21, a turbine liner 22, a stator 23, a one way clutch 24, and the working oil which is the working fluid interposed between the pump impeller 21 and the turbine liner 22.

The pump impeller 21 is transmitted with the power transmitted to the front cover 10 and transmits the transmitted power to the turbine liner 22 via the working oil. In the pump impeller 21, an outside end section of a pump shell 21a in the radial direction, which is formed by being curved to the output side in a ring shape coaxially with the rotation axis X, is fixed to the front cover flange section 12. The pump impeller 21 rotates integrally with the front cover 10, and the power transmitted to the front cover 10 is transmitted to pump blades (blades) 21b, which are disposed on an inner circumferential surface of the pump shell 21a along the circumferential direction at equal intervals, via the pump shell 21a. Further, in the pump impeller 21, an inside end section of the pump shell 21a in the radial direction is fixed to a sleeve 21c. An inside of a cylindrical section of the sleeve 21c is input with parts of the output shaft 50 and a housing 52.

The turbine liner 22 transmits the power transmitted from the pump impeller 21 via the working oil to the output shaft 50. The turbine liner 22 is disposed so as to confront the pump impeller 21 with respect to the axial direction. The turbine liner 22 is provided with turbine blades (blades) 22b disposed on an inner circumferential surface of a turbine shell 22a, which is formed in a ring shape coaxially with the rotation axis X and curved to the input side, along the circumferential direction at equal intervals. In the turbine liner 22, an inside end section of the turbine shell 22a in the radial direction is fixed to a hub 51.

The stator 23 has stator blades (blades) 23a formed in the circumferential direction, change a flow of the working oil which circulates between the pump impeller 21 and the turbine liner 22 by the stator blades 23a, and obtains predetermined torque characteristics based on a transmitted power.

The one way clutch 24 supports the stator 23 so that the stator 23 can rotate only in one direction with respect to the housing 52 which accommodates the torque converter 1.

Here, the hub 51 is a base section of the turbine liner 22 and disposed inside of the turbine liner 22 in the radial direction. The hub 51 is formed in an annular state coaxially with the rotation axis X, and an inside of the hub 51 in the radial direction is inserted with the output shaft 50. The hub 51 is connected to the output shaft 50 via, for example, a spline engagement section, thereby the hub 51 and the output shaft 50 are configured so that they can transmit power mutually.

Accordingly, the turbine shell 22a can rotate integrally with the output shaft 50 via the hub 51, and power, which is transmitted via the pump impeller 21, the working oil, and the turbine liner 22 that constitute the fluid transmission mechanism 20, is transmitted to the output shaft 50 by that the turbine liner 22 rotates integrally with the output shaft 50.

The lock-up clutch mechanism 30 is a lock-up clutch section and directly transmits the power transmitted to the front cover 10 to the output shaft 50 via a friction engagement section 32 without via the working fluid of the fluid transmission mechanism 20. The lock-up clutch mechanism 30 has a lock-up piston 31 as the engagement member, the friction engagement section 32, a working fluid flow path 33, and a piston hydraulic pressure chamber 34. In the lock-up clutch mechanism 30, a front cover inner wall surface 36 of the front cover 10 which constitutes one friction surface of the friction engagement section 32, a friction member 35 which constitutes the other friction surface of the friction engagement section 32, and the lock-up piston 31 are disposed in this order from the input side to the output side with respect to the axial direction.

The lock-up piston 31 is the engagement member, is formed in an annular plate shape coaxially with the rotation axis X, and is interposed between the front cover 10 and the turbine liner 22 with respect to the axial direction. The lock-up piston 31 is disposed so as to confront the front cover 10 in the axial direction.

In the lock-up piston 31, a radial direction outside end section 31a, which is formed so as to be bent to the turbine liner 22 side, is supported so as to be able to relatively move in the axial direction with respect to an outside end section 43a in the radial direction of a center holding plate 43 of the damper mechanism 40, which will be described later, via a coupling section 37 as well as so as to be able to rotate integrally with the center holding plate 43. Accordingly, the lock-up piston 31 is configured such that the lock-up piston 31 is coupled so as to be able to transmit the power transmitted to the lock-up piston 31 to the center holding plate 43 of the damper mechanism 40 as well as can relatively move in the axial direction also with respect to the front cover 10, that is, the lock-up piston 31 is configured so as to be able to approach and to be away from the front cover 10.

The friction engagement section 32 is configured as a friction engagement surface which permits the friction member 35 to be friction-engaged with the front cover inner wall surface 36. The front cover inner wall surface 36 is a wall surface which confronts the lock-up piston 31 in the axial direction in the front cover main body section 11. The friction member 35 is disposed in the vicinity of the radial direction outside end section 31a of a wall surface which confronts the front cover main body section 11 in the axial direction in the lock-up piston 31. The friction member 35 is formed in an annular plate state coaxially with the rotation axis X. The friction engagement section 32 can be friction-engaged by that the front cover inner wall surface 36, which constitutes one surface of the friction engagement section 32, comes into contact with the friction member 35, which constitutes the other surface of the friction engagement section 32, that is, the friction engagement section 32 can engage the radial direction outside end section 31a of the lock-up piston 31 with the front cover 10.

In the lock-up clutch mechanism 30, a radial direction inside end section 31b of the lock-up piston 31 confronts and comes into contact with an outer circumferential surface of a radial direction inside end section of the hub 51 (a surface opposite to a surface in contact with the output shaft 50) and is supported so as to be able to slide in the axial direction as well as a seal member S1, which suppresses a leakage of the working fluid (working oil), is interposed between the radial direction inside end section 31b and an outer circumferential surface of the radial direction inside end section of the hub 51. With the configuration, an inside of the torque converter 1 partitioned by the front cover 10 and the pump shell 21a is partitioned to a fluid transmission mechanism space section A and a clutch space section B by the lock-up piston 31. The fluid transmission mechanism space section A is the space partitioned by the lock-up piston 31 and the pump shell 21a with respect to the axial direction and is a space in which the fluid transmission mechanism 20 is positioned. The clutch space section B is the space partitioned by the front cover 10 and the lock-up piston 31 with respect to the axial direction and is a space in which the friction member 35 of the lock-up clutch mechanism 30 is positioned. The fluid transmission mechanism space section A can communicate with the clutch space section B via a communication section between the radial direction outside end section 31a and the front cover flange section 12 on the friction engagement section 32 side.

The working fluid flow path 33 is formed as a space section which permits the working fluid (working oil) to pass between the lock-up piston 31 and the front cover 10 with respect to the axial direction. Here, the clutch space section B functions as the working fluid flow path 33. The friction engagement section 32 is disposed to a section outside the clutch space section B in the radial direction which functions as the working fluid flow path 33.

The piston hydraulic pressure chamber 34 is used to generate a hydraulic pressure which moves the lock-up piston 31 in the axial direction. Here, the fluid transmission mechanism space section A functions as the piston hydraulic pressure chamber 34. As described above, the fluid transmission mechanism space section A which functions as the piston hydraulic pressure chamber 34 is formed as a space section which permits the working fluid (working oil) to pass between the lock-up piston 31 and the pump shell 21a. Then, the fluid transmission mechanism space section A which functions as the piston hydraulic pressure chamber 34 exerts a pressure force (thrust force) to the front cover 10 side of the lock-up piston 31 by exerting a hydraulic pressure of the working oil in the fluid transmission mechanism space section A on a pressure receiving surface 31c of the lock-up piston 31.

In the lock-up clutch mechanism 30 configured as described above, the lock-up clutch mechanism 30 is turned ON by that the lock-up piston 31 moves to and approaches the front cover 10 side along the axial direction and the friction member 35 comes into contact with and is friction-engaged with the front cover inner wall surface 36 by a liquid pressure (hydraulic pressure) of the working fluid (the working oil) supplied to the piston hydraulic pressure chamber 34 (the fluid transmission mechanism space section A). When the lock-up clutch mechanism 30 is turned ON, since the front cover 10 and the lock-up piston 31 are rotated integrally, the lock-up clutch mechanism 30 transmits the power transmitted to the front cover 10 to the center holding plate 43 of the damper mechanism 40 to be described later via the front cover inner wall surface 36, the friction member 35, and the lock-up piston 31 in this order.

Here, in the torque converter 1, the working oil is supplied from the hydraulic pressure control unit 60 as a hydraulic pressure control means to one of the piston hydraulic pressure chamber 34 (fluid transmission mechanism space section A) or the working fluid flow path 33 (clutch space section B). The hydraulic pressure control unit 60 controls a flow ratio or a hydraulic pressure of the working oil supplied to respective sections of the transmission including the torque converter 1.

Then, the hydraulic pressure control unit 60 can control a pressure difference between a hydraulic pressure of the fluid transmission mechanism space section A which functions as the piston hydraulic pressure chamber 34 and a hydraulic pressure of the clutch space section B which functions as the working fluid flow path 33, that is, can control a pressure force acting on the pressure receiving surface 31c, which is a surface on an output side of the lock-up piston 31 of the lock-up clutch mechanism 30, in the axial direction.

When the lock-up clutch mechanism 30 is ON controlled, the hydraulic pressure control unit 60 relatively lowers a hydraulic pressure of the working fluid flow path 33 and makes a hydraulic pressure of the piston hydraulic pressure chamber 34 larger than a hydraulic pressure of the working fluid flow path 33 by, for example, supplying the working oil to or from the piston hydraulic pressure chamber 34 (fluid transmission mechanism space section A) and discharging the working oil from the working fluid flow path 33 (clutch space section B) to outside of the torque converter 1. With the operation, the hydraulic pressure control unit 60 moves the lock-up piston 31 to a side (input side) where the lock-up piston 31 approaches the front cover 10, causes the friction member 35 to come into contact with the front cover inner wall surface 36, causes the front cover 10 to be friction-engaged with the lock-up piston 31 via the friction engagement section 32, and causes the front cover 10 and the lock-up piston 31 to be rotated integrally.

Further, when the lock-up clutch mechanism 30 is OFF controlled, the hydraulic pressure control unit 60 makes the hydraulic pressure of the working fluid flow path 33 larger than or equal to the hydraulic pressure of the piston hydraulic pressure chamber 34 by, for example, supplying the working oil to the working fluid flow path 33 (clutch space section B) and discharging the working oil from the piston hydraulic pressure chamber 34 (fluid transmission mechanism space section A) to outside of the torque converter 1. With the operation, the hydraulic pressure control unit 60 moves the lock-up piston 31 to a side (output side) where the lock-up piston 31 is away from the front cover 10, causes the friction member 35, which is friction-engaged with the front cover inner wall surface 36, to be away from the front cover inner wall surface 36, releases the friction engagement of the friction member 35 with the front cover inner wall surface 36, places them in a non-engagement state, and releases the integral rotation of the lock-up piston 31 and the front cover 10.

The damper mechanism 40 is used to couple the front cover 10 with the output shaft 50 via damper springs 41 as elastic members so that the front cover 10 and the output shaft 50 can relatively rotate and is interposed between the turbine shell 22a and the lock-up piston 31 with respect to the axial direction. The damper mechanism 40 has the damper springs 41 as the elastic members and a holding member 42. The holding member 42 of the embodiment is used to hold the damper springs 41, is configured including the center holding plate 43 to which a center holding section 43b is disposed, a first side holding plate 44 to which a first side holding section 44b is disposed, and a second side holding plate 45 to which a second side holding section 45b is disposed, and the center holding plate 43, the first side holding plate 44, and the second side holding plate 45 are formed in an annular plate state coaxially with the rotation axis X, respectively. In the damper mechanism 40, the first side holding plate 44, the center holding plate 43 and the damper springs 41, and the second side holding plate 45 are disposed from the input side to the output side with respect to the axial direction in this order. The damper springs 41 are, for example, coil springs, are held by the center holding section 43b, the first side holding section 44b, and the second side holding section 45b so as to able to transmit power, and transmits the power between the center holding plate 43 and the first side holding plate 44, and the second side holding plate 45 mutually. The first side holding plate 44 and the second side holding plate 45 are integrated by not shown rivets and disposed so as to be able to relatively rotate with respect to the center holding plate 43 in the integrated state.

The damper mechanism 40 transmits the power transmitted to the lock-up piston 31 to the center holding plate 43 by the coupling section 37 and transmits the transmitted power to the first side holding plate 44 and the second side holding plate 45 via a circumferential direction end section of the center holding section 43b, the damper springs 41, and circumferential direction end sections of the first side holding section 44b and the second side holding section 45b. Then, the damper mechanism 40 transmits the power transmitted to the first side holding plate 44 and the second side holding plate 45 from an inside end section 45a of the second side holding plate 45 in the radial direction to the output shaft 50 via the hub 51. Accordingly, the damper mechanism 40 can transmit the power transmitted to the center holding plate 43 to the output shaft 50 via the damper springs 41. During the period, the respective damper springs 41 are elastically deformed in accordance with a magnitude of the transmitted power while being held between the circumferential direction end section of the center holding section 43b of the center holding plate 43 and the first side holding plate 44, the first side holding section 44b of the second side holding plate 45, and the circumferential direction end section of the second side holding section 45b, respectively.

Next, a basic operation of the torque converter 1 according to the embodiment will be explained. In the torque converter 1, when the engine 3 generates power and the crank shaft 4 is rotated, the power from the engine 3 is transmitted to the front cover 10 via the drive plate 80. The power from the engine 3 transmitted to the front cover 10 is transmitted to the pump shell 21a of the pump impeller 21 couple with the front cover 10, and the pump impeller 21 is rotated. When the pump impeller 21 is rotated, the working oil of the fluid transmission mechanism space section A circulates between the pump blade 21b and the turbine blade 22b and the stator blades 23a of the stator 23 and operates as a fluid coupling. With the operation, the power from the engine 3 transmitted to the front cover 10 is transmitted to the turbine liner 22 via the pump impeller 21 and the working oil, and the turbine liner 22 is rotated in the same direction as the front cover 10. At the time, the stator 23 changes a flow of the working oil which circulates between the pump blade 21b the turbine blade 22b via the stator blades 23a, and thereby the torque converter 1 can obtain predetermined torque characteristics.

Then, when the lock-up clutch mechanism 30 is turned OFF, a friction engagement of the friction engagement section 32 is released. Accordingly, the power transmitted to the turbine liner 22 via the working oil is transmitted to the output shaft 50 via the hub 51. That is, when the lock-up clutch mechanism 30 is turned OFF, the power transmitted to the front cover 10 is transmitted to the output shaft 50 via the fluid transmission mechanism 20.

In contrast, when the lock-up clutch mechanism 30 is turned ON, the front cover 10 and the lock-up piston 31 are rotated integrally by that the friction engagement section 32 is friction-engaged. Accordingly, the power transmitted to the front cover 10 is transmitted to the lock-up piston 31 via the friction engagement section 32. The power transmitted to the lock-up piston 31 is transmitted to the hub 51 via the damper mechanism 40. That is, when the lock-up clutch mechanism 30 is turned ON, the power transmitted to the front cover 10 is directly transmitted to the output shaft 50 via the lock-up clutch mechanism 30, the damper mechanism 40, and the hub 51 without via the working oil.

Then, when the lock-up clutch mechanism 30 changes from OFF to ON or from ON to OFF, when the power from the engine 3 changes, when a resistance from a road surface transmitted to the output shaft 50 changes, and the like, power transmitted between the front cover 10 and the output shaft 50 (drive power from the engine 3 and driven power transmitted from the road surface) vary, and the front cover 10 positioned on a drive side and the output shaft 50 positioned on a driven side across the damper mechanism 40 tend to relatively rotate. At the time, as the front cover 10 on the drive side and the output shaft 50 on the driven side rotate relatively, the respective damper springs 41 of the damper mechanism 40 are elasticity deformed between the center holding plate 43 and the first side holding plate 44, and the second side holding plate 45, respectively in accordance with a variation of the power transmitted between the front cover 10 side and the output shaft 50 side. With the operation, since the respective damper springs 41 absorb a vibration caused by, for example, an explosion of the engine 3, a vibration such as a muffled sound and the like generated when power is transmitted via the damper mechanism 40 can be reduced.

The ECU 70 is mainly composed of a microcomputer and controls respective sections based on various input signals, which are input from sensors attached to respective positions of the vehicle 2 on which the torque converter 1, the engine 3, the transmission 5, and the like are mounted, and on various maps, and the like. The ECU 70 is electrically connected to the hydraulic pressure control unit 60 and executes an open/close control of various valves of the hydraulic pressure control unit 60, and the like. The ECU 70 executes an ON/OFF control of the lock-up clutch mechanism 30 and a slip control of the lock-up clutch mechanism 30 by controlling a supply and a discharge of the working oil to and from the piston hydraulic pressure chamber 34 (fluid transmission mechanism space section A) or the working fluid flow path 33 (clutch space section B) by controlling the hydraulic pressure control unit 60. Note that the torque converter 1 according to the embodiment is explained assuming that a control unit of the present invention is configured by being assembled to the ECU 70, that is, assuming that the ECU 70 serves also as the control unit, the control unit is not limited thereto. The torque converter 1 may be configured such that the control unit of the present invention is configured independently of the ECU 70 and connected to the ECU 70.

Incidentally, in the vehicle 2 to which the torque converter 1 configured as described above is applied, there is a case that a fuel consumption is improved by, for example, supercharging and downsizing the engine 3 which is the power source. That is, the supercharged and downsized engine (downsized supercharge engine) 3 compensates for insufficient torque by a supercharge effect by being applied with a supercharger such as a turbocharger and the like in addition to a configuration that the engine 3 is provided with a relatively small displacement and a smaller number of cylinders. With the configuration, the engine 3 realizes an output and torque which are the same as those of an NA (natural aspiration) engine, which has a relatively large exhaust amount, by the relatively small exhaust amount.

Here, in the engine 3 to which the supercharger is applied as described above, there is a tendency that when, for example, the engine 3 starts from an idle operation state, an engine revolution number is low and it is difficult for a sufficient supercharged pressure to act.

FIG. 3 is a view comparing engine performance of the supercharged and downsized engine (supercharged DS engine) 3 with engine performance of the conventional NA engine (large NA engine), wherein a horizontal axis shows an engine revolution number and a vertical axis shows torque (engine torque). As apparent from the view, when a supercharged pressure acts sufficiently, although the engine 3 to which the supercharger is applied can generate torque large than the NA engine, when no supercharged pressure act, torque which can be generated by the engine 3 is small in comparison with the conventional NA engine. Accordingly, in the vehicle 2 to which the downsized supercharge engine 3 is applied, there is a possibility that start performance is deteriorated because drive torque becomes insufficient, a limp occurs at the time of start, and the like until an engine revolution number increases, an exhaust gas flow ratio increases, and sufficient supercharged pressure acts in an intake path.

Accordingly, in the torque converter 1 of the embodiment, a torque ratio of the fluid transmission mechanism 20 is set relatively larger in comparison with a torque ratio of a torque converter applied to the conventional NA engine and the like, and thereby the torque converter 1 increases torque amplified by the fluid transmission mechanism 20 at the time of start and increases torque transmitted from the fluid transmission mechanism 20 to the output shaft 50. In the torque converter 1 of the embodiment, a shape and a positional relation of the pump blade 21$b$, the turbine blade 22$b$, and the stator blades 23$a$ of the fluid transmission mechanism 20 are set so that the torque ratio of the fluid transmission mechanism 20 becomes relatively large.

Further, in the torque converter 1 of the embodiment, a torque capacitance of the fluid transmission mechanism 20 is set relatively small in comparison with a torque capacitance of a torque converter applied to the conventional NA engine, thereby reducing the power transmitted from the pump impeller 21 to the turbine liner 22 so as to reduce a resistance when the pump impeller 21 is rotated. Then, the torque converter 1 generates a slip between the pump impeller 21 and the turbine liner 22 to thereby increase the engine revolution number promptly so that the supercharged pressure acts in the intake path promptly. In the torque converter 1 of the embodiment, the shape and the positional relation of the pump blade 21$b$, the turbine blade 22$b$, and the stator blades 23$a$ of the fluid transmission mechanism 20 are set so that a torque capacitance coefficient of the fluid transmission mechanism 20 becomes relative small.

Note that, in the torque converter 1, as described above, the shape and the positional relation of the pump blade 21$b$, the turbine blade 22$b$, and the stator blades 23$a$ of the fluid transmission mechanism 20 are set so that the torque ratio of the fluid transmission mechanism 20 becomes relatively large, with a result that the torque capacitance of the fluid transmission mechanism 20 coefficient is set relatively small. Further, the torque converter 1 is not limited to the configuration described above, and the torque capacitance coefficient of the fluid transmission mechanism 20 can be also set relatively small by setting an outside diameter (outside diameter of the turbine liner 22) ϕD (refer to FIG. 1) of the fluid transmission mechanism 20 relatively small.

Here, typical characteristics of the torque converter 1 of the embodiment are generally defined by the following expressions (1) to (3) and further can be also shown as a function of a speed ratio e as shown in FIG. 5 to be described later. The speed ratio e is defined by the following expression (4). In the expression (1) to the expression (4), "η" shows (a transmission) efficiency, "t" shows a torque ratio, "C" shows a torque capacitance coefficient as the typical characteristics of the torque converter 1. Further, in the expression (1) to the expression (4), "e" shows a speed ratio, "Tin" shows an input shaft torque (for example, torque generated to the front cover 10 which is the input member or to the pump impeller 21), "Tout" shows output shaft torque (for example, torque generated to the output shaft 50 which is the output member or to the turbine liner 22), "Nin" shows an input shaft revolution number (for example, a number of rotation of the front cover 10 which is the input member or the pump impeller 21), and "Nout" shows an output shaft revolution number (for example, a number of rotation of the output shaft 50 which is the output member or the turbine liner 22).

$$\eta = e \cdot t \tag{1}$$

$$t = T\text{out}/T\text{in} \tag{2}$$

$$C = T\text{in}/(N\text{in})^2 \tag{3}$$

$$e = N\text{out}/N\text{in} \tag{4}$$

Then, in the torque converter 1 of the embodiment, since the torque ratio of the fluid transmission mechanism 20 is set relatively large and further the torque capacitance coefficient of the fluid transmission mechanism 20 is set relatively small, even in the vehicle 2 to which the downsized supercharge engine 3 is applied, torque, which is amplified by the fluid transmission mechanism 20 at the time of start, is relatively increased and further the engine revolution number promptly increases and the supercharged pressure acts in the intake path at an early time, and thereby it can be suppressed that start torque (drive torque) become insufficient at the time of start and that the start performance is deteriorated such as an occurrence of the limp at the time of start.

In contrast, in the torque converter 1, when the torque ratio of the fluid transmission mechanism 20 is set relatively large and the torque capacitance coefficient is set relatively small as described above, there is a possibility that, when, for example, engine torque abruptly increases, the torque is excessively amplified by the fluid transmission mechanism 20 and the excessive torque is output from the output shaft 50 to the transmission 5 on a rear stage. Accordingly, it is desired in the torque converter 1 that appropriate start performance is realized even when, for example, the engine 3 which is the power source is supercharged and downsized as described above.

Thus, the torque converter 1 of the embodiment realizes the appropriate start performance by that the ECU 70 as the control unit executes a torque ratio variable control in an operation state that the fluid transmission mechanism 20 amplifies torque input to the front cover 10 and outputs the torque from the output shaft 50.

In the operation state that the fluid transmission mechanism 20 amplifies and outputs torque, the ECU 70 of the embodiment executes the torque ratio variable control. The ECU 70 executes the torque ratio variable control which makes a torque ratio variable by adjusting a friction engagement state of the friction engagement section 32.

Here, the torque ratio of the torque converter 1 which the ECU 70 variably controls is a ratio of torque output from the output shaft 50 and torque input to the front cover 10. In the torque converter 1, although a torque ratio tb of the fluid transmission mechanism 20 is set to a fixed value at respective speed ratios, a torque ratio t in the overall torque converter 1 is variably controlled as described below by adjusting the friction engagement state of the friction engagement section 32.

Here, the operation state that the fluid transmission mechanism 20 amplifies and outputs torque typically corresponds to a state that when the vehicle 2 starts, the fluid transmission mechanism 20 of the torque converter 1 is operated in a so-called converter range. As shown in FIG. 5 to be described later, the torque ratio tb of the fluid transmission mechanism 20 is maximized when the speed ratio e is 0, is reduced as the speed ratio e increases, and becomes approximately 1.0 at a point equal to or more than a clutch point. The converter range is a speed ratio range when the speed ratio is from 0 to the clutch point and is a speed ratio range in which a torque amplification effect can be obtained by the fluid transmission mechanism 20. Note that the speed ratio range when the speed ratio is from the clutch point to 1 is called a coupling range (coupling range), that is, the coupling range is a speed ratio range in which no torque amplification effect is obtained by the fluid transmission mechanism 20.

The ECU 70 of the embodiment sets a target torque ratio tt which is a target torque ratio of the torque ratio variable control in accordance with an operation state of the vehicle 2 and the like, executes the torque ratio variable control by adjusting the friction engagement state of the friction engagement section 32 so that an actual torque ratio t in the overall torque converter 1 is converged to the target torque ratio tt, and changes the torque ratio t in the overall torque converter 1 in accordance with the operation state of the vehicle 2, and the like.

The ECU 70 of the embodiment adjusts a pressure force acting between the friction member 35 which constitutes the friction engagement section 32 and the front cover inner wall surface 36 by adjusting the hydraulic pressure of the working oil in the piston hydraulic pressure chamber 34 of the lock-up clutch mechanism 30 (hydraulic pressure of the working fluid) based on the target torque ratio tt. With the operation, the ECU 70 adjusts a slip amount between the friction member 35 and the front cover inner wall surface 36 and adjusts the friction engagement state of the friction engagement section 32, thereby adjusting the actual torque ratio t in the overall torque converter 1. In other words, the ECU 70 adjusts torque transmitted from the front cover 10 to the output shaft 50 via the friction engagement section 32 of the lock-up clutch mechanism 30 by adjusting the hydraulic pressure of the working oil in the piston hydraulic pressure chamber 34 of the lock-up clutch mechanism 30 based on the target torque ratio tt, thereby adjusting the actual torque ratio t in the overall torque converter 1 to an optional value.

Here, the ECU 70 supplies the working oil from the hydraulic pressure control unit 60 to the piston hydraulic pressure chamber 34 as well as keeps a hydraulic pressure of the piston hydraulic pressure chamber 34 and a hydraulic pressure of the working fluid flow path 33 at a predetermined balance so that a state, in which the friction member 35 of the friction engagement section 32 and the front cover inner wall surface 36 relatively rotate and slip while being in contact with each other, can be obtained. The ECU 70 forms a state in which the friction member 35 of the friction engagement section 32 and the front cover inner wall surface 36 slip, that is, a semi-engaged state, and thereby the ECU 70 forms a power transmission state, which is between a released state and an engaged state in the friction engagement section 32, is formed. Then, the ECU 70 adjusts a pressure difference between the piston hydraulic pressure chamber 34 and the working fluid flow path 33 by adjusting the balance between the hydraulic pressure of the piston hydraulic pressure chamber 34 and the hydraulic pressure of the working fluid flow path 33, that is, by adjusting the hydraulic pressure of the piston hydraulic pressure chamber 34 so that the ECU 70 can adjust a slip amount between the friction member 35 and the front cover inner wall surface 36. With the operation, the ECU 70 can adjust a magnitude of torque transmitted from the front cover 10 to the output shaft 50 via the friction engagement section 32 of the lock-up clutch mechanism 30 and can adjust the actual torque ratio t in the overall torque converter 1 by adjusting the slip amount between the friction member 35 and the front cover inner wall surface 36.

It is assumed, for example, that the torque ratio tb of the fluid transmission mechanism 20 is "2" and torque that is input to the front cover 10 is "1". In the case, when the lock-up clutch mechanism 30 is turned OFF and the friction member 35 which constitutes the friction engagement section 32 and the front cover inner wall surface 36 are placed in a non-engaged state, the torque transmitted from the front cover 10 to the output shaft 50 via the friction engagement section 32 becomes "0", whereas torque transmitted from the front cover 10 to the output shaft 50 via the fluid transmission mechanism 20 is amplified from "1" to "2" by the fluid transmission mechanism 20 and transmitted to the output shaft 50. That is, in the case, since the torque input to the front cover 10 is amplified from "1" to "2" by the torque converter 1 and output from the output shaft 50, the torque ratio t in the overall torque converter 1 becomes "2" which is the same as the torque ratio tb of the fluid transmission mechanism 20.

In contrast, when the friction engagement section 32 of the lock-up clutch mechanism 30 is placed in the semi-engaged state and the friction member 35 and the front cover inner wall surface 36 are placed in a state in which they slip, the torque transmitted from the front cover 10 to the output shaft 50 via the friction engagement section 32 becomes a magnitude in accordance with the slip amount between the friction member 35 and the front cover inner wall surface 36, for example, "0.5", whereas the torque transmitted from the front cover 10 to the output shaft 50 via the fluid transmission mechanism 20 is amplified from "0.5" to "1" by the fluid transmission mechanism 20 and transmitted to the output shaft 50. That is, in the case, since the torque input to the front cover 10 is amplified from "1" to "1.5" by the torque converter 1 and output from the output shaft 50, the torque ratio t in the overall torque converter 1 becomes "1.5".

Further, when the lock-up clutch mechanism 30 is turned ON and the friction member 35 which constitutes the friction engagement section 32 and the front cover inner wall surface 36 are placed in a perfectly engaged state, the torque transmitted from the front cover 10 to the output shaft 50 via the friction engagement section 32 becomes "1", whereas the torque transmitted from the front cover 10 to the output shaft 50 via the fluid transmission mechanism 20 becomes "0". That is, in the case, since the torque input to the front cover 10 is output from the output shaft 50 in the state of "1" without being amplified by the torque converter 1, the torque ratio t in the overall torque converter 1 becomes "1".

As described above, in the operation state that the fluid transmission mechanism 20 amplifies and outputs the torque, since the ECU 70 adjusts the hydraulic pressure of the working oil of the piston hydraulic pressure chamber 34 based on the target torque ratio tt, adjusts the pressure force acting between the friction member 35 and the front cover inner wall surface 36, adjusts the slip amount between the friction member 35 and the front cover inner wall surface 36, adjusts the friction engagement state of the friction engagement section 32, and adjusts the torque transmitted to the output shaft 50 via the friction engagement section 32, the ECU 70 makes the torque ratio t in the overall torque converter 1 variable between from the torque ratio tb of the fluid transmission mechanism 20 to "1" which is a torque ratio when the friction engagement section 32 is perfectly engaged.

Here, the target torque ratio tt is set to satisfy target (ideal) performance of the torque converter 1 in accordance with the operation state of the vehicle 2, and thereby the torque ratio t in the overall torque converter 1 is changed so as to satisfy the target performance of the torque converter 1 in accordance with the operation state of the vehicle 2. The torque ratio tb of the fluid transmission mechanism 20 which is set as the fixed value in the respective speed ratios is set to the relatively large value as described above and is further set here to a magnitude equal to or more than the target torque ratio tt in accordance with the target performance of the torque converter 1 which can be assumed in accordance with the operation state of the vehicle 2. The torque ratio tb of the fluid transmission mechanism 20 is set to the same value as a maximum value of the target torque ratio tt in accordance with the target performance of the torque converter 1 which can be assumed in an ordinary operation state of the vehicle 2 or set to a value determined by providing a somewhat margin with the maximum value of the target torque ratio tt which can be assumed, and the target torque ratio tt is set to a value which is equal to or less than the torque ratio tb of the fluid transmission mechanism 20 as well as equal to or more than "1". That is, the target torque ratio tt is set in a range of tb≥tt≥1 so that the torque converter 1 can exhibit ideal target performance in accordance with the operation state of the vehicle 2, and the torque ratio t in the overall torque converter 1 is changed by that the friction engagement state of the friction engagement section 32 is adjusted in accordance with the thus set target torque ratio tt.

When, for example, relatively large drive torque is required at the time, the vehicle 2 starts on a slope road, and the like, the ECU 70 places the friction member 35 which constitutes the friction engagement section 32 and the front cover inner wall surface 36 in the non-engaged state and sets the torque ratio t in the overall torque converter 1 to a maximum torque ratio, that is, to the torque ratio tb of the fluid transmission mechanism 20, and thereby the torque converter 1 can exhibit the ideal target performance in accordance with the operation state of the vehicle 2 and, for example, the occurrence of the limp at the time of start can be suppressed so that start performance of the vehicle 2 can be improved. Further, when, for example, the operation state of the vehicle 2 is an operation state in which engine torque can be abruptly increased, the ECU 70 places the friction member 35 which constitutes the friction engagement section 32 and the front cover inner wall surface 36 in the semi-engaged state or in the perfectly engaged state and transmits a part of the torque transmitted to the front cover 10 via the friction engagement section 32, and thereby an apparent torque capacitance in the overall torque converter 1 increases and the ECU 70 can reduce a slip of the turbine liner 22 to the pump impeller 21. As a result, the ECU 70 can appropriately set the torque ratio t in the overall torque converter 1 to a value smaller than the torque ratio tb of the fluid transmission mechanism 20. With the operation, the torque converter 1 can exhibit the ideal target performance in accordance with the operation state of the vehicle 2 and can prevent that excessive torque is output from, for example, the output shaft 50 to the transmission 5 on the rear stage.

Specifically, as shown in FIG. 1, the ECU 70 is configured including a target torque ratio setting unit 71, a target hydraulic pressure setting unit 72, a hydraulic pressure control unit 73, and an acquisition/determination unit 74.

Here, the ECU 70 is mainly composed of the microcomputer, has an processing unit 70a, a storage unit 70b and an input/output unit 70c which are connected with each other and can deliver a signal with each other. The input/output unit 70c is connected with a not shown drive circuit which drives respective sections of the vehicle 2 including the torque converter 1 and the various sensors described above, and the input/output unit 70c inputs and outputs a signal between these sensors and the like. Further, the storage unit 70b stores a computer program which controls the respective sections. The storage unit 70b can be composed of non-volatile memory such as a hard disc device, a magneto optical disk device, flash memory and the like (a storage medium, which can only read data such as CD-ROM and the like), volatile memory such as RAM (random access memory) or a combination thereof. The processing unit 70a is composed of a not shown memory and a CPU (central processing unit) and has at least the target torque ratio setting unit 71, the target hydraulic pressure setting unit 72, the hydraulic pressure control unit 73, and the acquisition/determination unit 74 described above. Various types of controls by the ECU 70 are executed by that the processing unit 70a reads the computer program to a memory assembled to the processing unit 70a and executes an arithmetic operation based on a result of detection by the sensors disposed to the respective sections and sends a control signal in accordance with a result of the arithmetic operation. At the time, the processing unit 70a appropriately stores a numerical value while the arithmetic operation is being executed to the storage unit 70b and further executes an arithmetic operation by taking out the stored numerical value. Note that, when the respective sections of the torque converter 1 are controlled, the respective sections may be controlled by dedicated hardware different from the ECU 70 in place of by the computer program.

Then, the target torque ratio setting unit 71 sets the target torque ratio tt in accordance with the operation state of the vehicle 2 and the like. The target torque ratio setting unit 71 of the embodiment sets the target torque ratio tt in accordance with delayed supercharging of the engine 3 as well as further sets the target torque ratio tt so that the target torque ratio tt becomes a torque ratio in accordance with allowable torque Tmax in the power transmission system to which the torque output from the output shaft 50 of the torque converter 1 is transmitted.

Here, the target torque ratio setting unit 71 sets the target torque ratio tt based on, for example, actual engine torque (actual engine torque) generated by the engine, a gear shift stage or a gear shift ratio of the transmission 5 which is the power transmission system to which the torque output from the output shaft 50 is transmitted, and a speed ratio which is a ratio of a rotational speed of the output shaft 50 and a rotational speed of the front cover 10. With the operation, the target torque ratio setting unit 71 sets the target torque ratio tt in accordance with the supercharging delay of the engine 3 as well as in accordance with the allowable torque Tmax of the power transmission system.

Specifically, the target torque ratio setting unit 71 of the embodiment first sets the target torque ratio tt in accordance with a deviation between target engine torque (target engine torque) which is assumed to be generated by the engine 3 when supercharging is executed without the supercharging delay and actual engine torque (actual engine torque) which is actually generated by the engine 3. The target torque ratio setting unit 71 sets the target torque ratio tt to a relatively large torque ratio on a side where the deviation between the target engine torque and the actual engine torque is relatively large and sets the target torque ratio tt to a relatively small torque ratio on a side where the deviation is relatively small. More specifically, the target torque ratio setting unit 71 sets the target torque ratio tt so that torque amplified by the torque converter 1 becomes relatively large as the deviation becomes relatively large and sets the target torque ratio tt so that the torque amplified by the torque converter 1 becomes relative small as the deviation becomes relative small. Further, in other words, the target torque ratio setting unit 71 sets the target torque ratio tt so that torque corresponding to the deviation between the target engine torque which is assumed when a supercharged pressure sufficiently acts and the actual engine torque can be compensated by the torque amplified by the torque converter 1, that is, the torque amplified by the torque converter 1 becomes the same as the torque corresponding to the deviation.

That is, the target torque ratio setting unit 71 sets the target torque ratio tt so that the torque ratio t of the torque converter 1 is set to a relatively large value during a period until the engine revolution number is increased from a time at which the supercharger of the engine 3 starts operation and the engine revolution number or the supercharged pressure in accordance with the engine revolution number reaches a target, amplifies torque created by the torque converter 1, and compensates for a difference between target engine torque which is assumed when the supercharged pressure sufficiently acts and the actual engine torque. With the operation, the torque converter 1 can secure appropriate start performance in accordance with the supercharging delay of the engine 3.

Here, the target torque ratio setting unit 71 sets the target torque ratio tt in accordance with the deviation between the target engine torque and the actual engine torque (actual engine torque) based on, for example, the target torque ratio maps shown in FIG. 4, the gear shift stage or the gear shift ratio of the transmission 5, and the speed ratio. Note that, in the embodiment an explanation will be made assuming that the transmission 5 is the Automatic Transmission which has plural gear stages (gear shift stages) and in which one of the gear stages (gear shift stages) is automatically selected in accordance with various operation states.

FIG. 4 is a view showing an example of the target torque ratio maps. The target torque ratio setting unit 71 obtains the target torque ratio tt in accordance with the supercharging delay of the engine 3 based on, for example, the target torque ratio maps of FIG. 4. The target torque ratio maps are used to set the target torque ratio tt in accordance with the supercharging delay of the engine 3 from a relation between a gear stage (gear shift stage) selected at the time and a speed ratio at the time. In the target torque ratio maps, a horizontal axis shows a speed ratio and a vertical axis shows a torque ratio. The target torque ratio maps describe a relation between speed ratios at respective gear stages, and the target torque ratio tt which is made variable between the torque ratio tb of the fluid transmission mechanism 20 and a clutch torque ratio tcl (=1). In the target torque ratio maps, a relation between the gear stage, the speed ratio, and the target torque ratio tt is previously set and stored in the storage unit 70b.

In the target torque ratio maps exemplified in FIG. 4, the target torque ratio tt is set to satisfy the target (ideal) performance of the torque converter 1 in accordance with the operation state of the vehicle 2 with respect to a combination of a predetermined gear stage and a predetermined speed ratio based on a result of an experiment and a simulation executed previously. Here, in the target torque ratio maps, the relation between the gear stage and the speed ratio and the target torque ratio tt is set a relation which becomes the target torque ratio tt in accordance with the deviation between the target torque ratio tt in accordance with the supercharging delay of the engine 3, that is, the target engine torque assumed when the supercharged pressure sufficient acts and the actual engine torque as described above based on the result of the experiment and the simulation executed previously.

The target torque ratio setting unit 71 obtains the target torque ratio tt from the gear stage (gear shift stage) selected at the time and the speed ratio at the time based on the target torque ratio maps exemplified in the FIG. 4. In the case, the target torque ratio setting unit 71 obtains gear stage information selected at the time from, for example, the transmission 5 as well as obtains a vehicle speed of the vehicle 2 detect by a vehicle speed sensor 90 (refer to FIG. 1) and an engine revolution number (revolution number of the crank shaft 4) of the engine 3 detected by an engine revolution number sensor 91 (refer to FIG. 1), and calculates a speed ratio in accordance with the engine revolution number at the time based the vehicle speed at the time and the gear stage information selected at the time.

Note that, in the embodiment, although the target torque ratio setting unit 71 obtains the target torque ratio tt using the target torque ratio maps, the embodiment is not limited thereto. The target torque ratio setting unit 71 may obtain the target torque ratio tt based on, for example, a mathematical expression corresponding to the target torque ratio maps. This is the same as to an arithmetic operation using maps explained below.

Then, the target torque ratio setting unit 71 calculates the target torque ratio tt in accordance with the supercharging delay of the engine 3 as described above and further corrects the target torque ratio tt in accordance with the allowable torque Tmax in the power transmission system to which the torque output from the output shaft 50 of the torque converter 1 is transmitted, and calculates a final target torque ratio tt.

The allowable torque Tmax in the power transmission system is, for example, an allowable torque Tmax in the transmission 5 having the plural gear stages (gear shift stages). The allowable torque Tmax of the transmission 5 is set as torque which can be allowed by the transmission 5 in accordance with each gear stage based on a result of, for example, an experiment and a simulation previously executed. The target torque ratio setting unit 71 obtains the gear stage information selected at the time from the transmission 5 and calculates the allowable torque Tmax in accordance with the gear stage selected at the time based on a not shown allowable torque map.

Then, the target torque ratio setting unit 71 multiplies the target torque ratio tt calculated in accordance with the supercharging delay of the engine 3 and the actual engine torque at the time and determines whether or not the torque obtained by the multiplication is equal to or less than the allowable torque Tmax. When the target torque ratio setting unit 71 determines that the obtained torque is larger than the allowable torque Tmax, the target torque ratio setting unit 71 guards an upper limit of the obtained torque by the allowable torque Tmax, and corrects the target torque ratio tt so that the obtained torque becomes equal to or less than the allowable torque Tmax.

That is, the target torque ratio setting unit 71 calculates the target torque ratio tt so that, for example, the following expression (5) is satisfied. In the expression (5), "tt" shows the target torque ratio, "Tmax" shows the allowable torque in accordance with a selected gear stage, and "Te" shows engine torque.

$$tt \leq Tmax/Te \quad (5)$$

In the case, it is sufficient for the target torque ratio setting unit 71 to calculate the actual engine torque Te at the time by various known methods. The target torque ratio setting unit 71 calculates the actual engine torque Te at the time from an engine torque map (not shown) based on, for example, the engine revolution number (revolution number of the crank shaft 4) of the engine 3 detected by the engine revolution number sensor 91 (refer to FIG. 1) and, a throttle open degree of the engine 3 detected by a throttle open degree sensor 92 (refer to FIG. 1). Then, the target torque ratio setting unit 71 calculates the target torque ratio tt by substituting the engine torque Te into the expression (5). With the calculation, the torque converter 1 can secure the appropriate start performance in accordance with the allowable torque Tmax of the power transmission system.

Accordingly, the target torque ratio setting unit 71 can set the target torque ratio tt in accordance with the supercharging delay of the engine 3 as well as with the allowable torque Tmax of the power transmission system based on the actual engine torque (actual engine torque) actually generated by the engine 3, the gear shift stage or the gear shift ratio of the transmission 5 which is the power transmission system to which the torque output from the output shaft 50 is transmitted, and the speed ratio which is the ratio of the rotational speed of the output shaft 50 and the rotational speed of the front cover 10. Then, the target torque ratio setting unit 71 outputs the calculate target torque ratio tt to the target hydraulic pressure setting unit 72.

The target hydraulic pressure setting unit 72 sets a target clutch engagement hydraulic pressure pt based on the target torque ratio tt set by the target torque ratio setting unit 71. The target clutch engagement hydraulic pressure pt is a target hydraulic pressure which is caused to act on the lock-up piston 31 to realize the target torque ratio tt and is a hydraulic pressure of a difference between a target of the hydraulic pressure of the piston hydraulic pressure chamber 34 and a target of the hydraulic pressure of the working fluid flow path 33.

Specifically, the target hydraulic pressure setting unit 72 calculates a target piston pressure force Pt based on the target torque ratio tt set by the target torque ratio setting unit 71 and the actual engine torque Te at the time and calculates the target clutch engagement hydraulic pressure pt based on the target piston pressure force Pt. The target piston pressure force Pt is a target pressure force which is caused to act between the friction member 35 and the front cover inner wall surface 36 to realize the target torque ratio tt, that is, a target piston pressure force (target piston thrust force) which presses the lock-up piston 31 to the front cover 10 side along the axial direction.

Here, a basic expression of torque generated to the respective sections of the torque converter 1 can be shown by the following expressions (6) to (9). Further, a piston pressure force P can be shown by the following expression (10). In the expressions (6) to (10), "Tp" shows converter pump torque (torque generated to the pump impeller 21), "Tt" shows converter turbine torque (torque generated to the turbine liner 22), "Tcl" shows clutch torque (torque transmitted to the output shaft 50 via the friction engagement section 32), "Te"

shows engine torque (torque generated to the crank shaft 4), and "P" shows a piston pressure force (force which presses the lock-up piston 31 to the front cover 10 side along the axial direction). Further, in the expressions (6) to (10), "C" shows the torque capacitance coefficient of the fluid transmission mechanism 20, "N" shows the engine revolution number (revolution number of the crank shaft 4), "tb" shows the torque ratio of the fluid transmission mechanism 20, "μ" shows a clutch friction coefficient (friction coefficient of axial friction surface of the friction engagement section 32), "R" shows a clutch representative radius (radius of the pressure receiving surface 31c of the lock-up piston 31), "K" shows a value obtained by multiplying the clutch friction coefficient μ and the clutch representative radius R, and "p" shows a clutch engagement hydraulic pressure (hydraulic pressure which generates the piston pressure force for engaging the friction engagement section 32 with the pressure receiving surface 31c, in other words, a hydraulic pressure of a difference between the hydraulic pressure of the piston hydraulic pressure chamber 34 and the hydraulic pressure of the working fluid flow path 33).

$$Tp = C \cdot N^2 \qquad (6)$$

$$Tt = tb \cdot C \cdot N^2 \qquad (7)$$

$$Tcl = \mu \cdot R \cdot P = K \cdot P \qquad (8)$$

$$Te = Tp + Tcl \qquad (9)$$

$$P = \pi \cdot R^2 \cdot p \qquad (10)$$

As apparent from the graph showing an example of respective torque ratios of the torque converter of FIG. 4, to realize a predetermined target torque ratio tt set by the target torque ratio setting unit 71, it is sufficient to satisfy the following expression (11). Note that, in FIG. 4, the torque ratio tb of the fluid transmission mechanism 20 corresponds to converter performance of the fluid transmission mechanism 20, the target torque ratio tt corresponds to target (ideal) performance of the torque converter 1 in a predetermined operation state, and the clutch torque ratio tcl is a torque ratio of torque transmitted via the lock-up clutch mechanism 30, that is, "1" and corresponds to clutch performance of the lock-up clutch mechanism 30.

$$Tcl:Tp = (tb-tt):(tt-1) \qquad (11)$$

Then, the clutch torque Tcl and the converter pump torque Tp can be shown by the following expressions (12), (13).

$$Tcl = [(tb-tt)/(tb-1)] \cdot Te \qquad (12)$$

$$Tp = [(tt-1)/(tb-1)] \cdot Te \qquad (13)$$

AS a result, the piston pressure force P can be shown by the following expression (14).

$$P = (tb-tt) \cdot [Te/(tb-1)] \cdot 1/K \qquad (14)$$

The target hydraulic pressure setting unit 72 calculates the target piston pressure force Pt which realizes the target torque ratio tt by substituting the target torque ratio tt set by the target torque ratio setting unit 71 and the actual engine torque Te at the time into the expression (14). The target hydraulic pressure setting unit 72 may calculate the actual engine torque Te at the time from the engine torque map (not shown) based on, for example, the throttle open degree and the engine revolution number as described above or may use the actual engine torque Te calculated by the target torque ratio setting unit 71.

Then, the target hydraulic pressure setting unit 72 calculates the target clutch engagement hydraulic pressure pt by substituting the calculated target piston pressure force Pt into the following expression (15).

$$p = P/(\pi \cdot R^2) \qquad (15)$$

The hydraulic pressure control unit 73 adjusts an actual hydraulic pressure of the working oil of the piston hydraulic pressure chamber 34 and eventually the clutch engagement hydraulic pressure p based on the target clutch engagement hydraulic pressure pt set by the target hydraulic pressure setting unit 72. The hydraulic pressure control unit 73 adjusts a hydraulic pressure of the working oil of the piston hydraulic pressure chamber 34 by controlling the supply and the discharge of the working oil to or from the piston hydraulic pressure chamber 34 or to or from the working fluid flow path 33 so that the actual clutch engagement hydraulic pressure p is converged to the target clutch engagement hydraulic pressure pt by controlling the hydraulic pressure control unit 60.

The acquisition/determination unit 74 obtains various information used in the torque ratio variable control and executes various determinations.

Here, FIG. 5 is a graph showing an example of performance characteristics of the torque converter 1, wherein a horizontal axis shows a speed ratio e and a vertical axis shows an efficiency η, a torque ratio t, and a torque capacity coefficient C. FIG. 6 is a view comparing start-time power performance of the torque converter 1 and a start-time power performance of a comparative example, wherein a horizontal axis shows an engine revolution number and a vertical axis shows torque (torque generated to the output shaft 50). FIG. 7 is a view comparing start-time drive torque of the torque converter 1 and start-time drive torque of the comparative example, wherein a horizontal axis shows a time axis and a vertical axis shows torque (drive torque acting on a contact point of the drive wheels 9 and a road surface).

Note that, in FIG. 5, "ηcl" shows a clutch efficiency of the torque converter 1. Further, the torque capacity coefficient C shown in FIG. 5 is a value in accordance with so-called specific input torque Tμ. Further, in FIG. 5, "η'" shows an efficiency of a torque converter according to a comparative example whose torque ratio is smaller than the torque ratio tb of the fluid transmission mechanism 20, and "t'" shows a torque ratio of the torque converter according to the comparative example. In FIG. 6, a solid line (thick solid line) L1 shows start-time power performance when the torque converter 1 of the embodiment is applied to the downsized supercharge engine 3, a solid line (thin solid line) Lds1-0 shows engine torque when a supercharged pressure does not sufficiently act in the downsized supercharge engine 3, a dashed-dotted line (thin dashed-dotted line) Lds2-0 shows engine torque when a supercharged pressure does not sufficient act in the downsized supercharge engine 3, a dotted line (thick dotted line) Lna1-0 shows engine torque of the conventional NA engine when an exhaust amount is set relatively large, a dotted line (thin dotted line) Lds1-1 shows start-time power performance when a supercharged pressure does not sufficient act and torque is amplified by a conventional torque converter in the downsized supercharge engine 3, a dotted line (thin dotted line) Lds1-2 shows start-time power performance when a supercharged pressure does not sufficiently act as well as torque is amplified at a relatively large torque ratio by a torque converter in the downsized supercharge engine 3, a two-dot-and-dash-line Lds2-1 shows start-time power performance in which a supercharged pressure sufficiently acts as well as torque is amplified at a relatively large torque ratio by a torque converter in the downsized supercharge engine 3, and a dashed-dotted line (thick dashed-dotted line) Lna1-1 shows start-time power performance when torque is amplified at a relatively small torque ratio by a torque converter in the conventional NA engine in which an exhaust amount is set relatively large. Further, in FIG. 6, a solid line (thin solid line) e1 shows characteristics of the torque converter 1 at a speed ratio e=0, a solid line (thin solid line) e2 shows characteristics of the torque converter 1 at the speed ratio e=0.5, a solid line (thin solid line) e3 shows characteristics of the torque converter 1 at the speed ratio e=0.7, a solid line (thin solid line) e4 shows characteristics of the torque converter 1 at the speed ratio e=0.9, and a dotted line (thin dotted line) Tmax shows allowable torque. In FIG. 7, a solid line A schematically shows start-time drive torque of the vehicle 2 in which the torque converter 1 of the embodiment is applied to the downsized supercharge engine 3, and a solid line B schematically shows start-time drive torque of a vehicle in which a torque converter set to relatively small torque ratio is applied to the conventional NA engine whose exhaust amount is set relatively large.

The torque converter 1 configured as described above adjusts the clutch engagement hydraulic pressure p, adjusts the piston pressure force P, adjusts the slip amount between the friction member 35 and the front cover inner wall surface 36, adjusts the friction engagement state of the friction engagement section 32, and adjusts the clutch torque Tcl in a converter range based on the target torque ratio tt. With the operation, as shown in FIG. 5, the torque converter 1 can make the torque ratio t in the overall torque converter 1 variable between from the torque ratio tb of the fluid transmission mechanism 20 to "1" which is the clutch torque ratio tcl when the friction engagement section 32 is perfectly engaged in accordance with various operation states.

Then, as apparent also from FIG. 6, in the vehicle 2 to which the torque converter 1 of the embodiment is applied, the torque generated to the output shaft 50 becomes relatively large. In the vehicle 2 to which the torque converter 1 is applied, although the torque generated to the output shaft 50 in a low rotation region becomes relatively small in comparison with a vehicle in which a torque converter set to a relatively small torque ratio is applied to the conventional NA engine, and the like, since an engine revolution number is promptly increased and a supercharged pressure acts on an intake path at an early time by that the torque capacitance coefficient C of the fluid transmission mechanism 20 is set relatively small as described above, actually, as shown in FIG. 7, as a time passes from the time of start, an increase of drive torque of the vehicle 2 to which the torque converter 1 of the embodiment is applied becomes relatively large, that is, the start performance is improved.

Then, in the torque converter 1 of the embodiment, in an operation state in which the fluid transmission mechanism 20 amplifies the torque input to the front cover 10 and outputs the torque from the output shaft 50, the ECU 70 executes the torque ratio variable control in accordance with the operation state of the vehicle 2 and, when, for example, the supercharging delay of the engine 3 occurs and when a large amount of drive torque is necessary, the torque converter 1 can exhibit the ideal target performance in accordance with the operation state of the vehicle 2 by setting the torque ratio t in the overall torque converter 1 to a relatively large value, for example, the torque converter 1 can improve the start performance of the vehicle 2 by eliminating the insufficient torque at the time of start and suppressing the occurrence of the limp at the time of start and can realize the appropriate start performance in accordance with the operation state. Further, in the torque converter 1, when the operation state of the vehicle 2 is in a operation state in which an abrupt increase of engine torque can be generated, the torque converter 1 can exhibit the ideal target performance in accordance with the operation state of the vehicle 2 by setting the torque ratio t in the overall torque converter 1 to a relatively small value sets and, for example, the torque converter 1 can prevent excessive torque from being output from the output shaft 50 to the transmission 5 on the rear stage and can realize the appropriate start performance in accordance with the operation state.

Next, an example of the torque ratio variable control of the torque converter 1 according to the embodiment will be explained referring to a flowchart of FIG. 8. Note that these control routines are repeatedly executed at a control cycle of several microseconds to several tens of microseconds.

First, the acquisition/determination unit 74 of the ECU 70 determines whether or not an idle switch is in an ON state (S100). The idle switch is used also as, for example, the throttle open degree sensor 92, and when an idle signal of an idle control ON is output from the throttle open degree sensor 92 used also as the idle switch (when, for example, a throttle open degree is in a totally closed state), the acquisition/determination unit 74 determines that the idle switch is in the ON state.

When the acquisition/determination unit 74 determines at S100 that the idle switch is not in the ON state (S100: No), the acquisition/determination unit 74 obtains an engine revolution number and a throttle open degree of the engine 3 measured by the engine revolution number sensor 91 and the throttle open degree sensor 92 (S102).

Next, the target torque ratio setting unit 71 of the ECU 70 calculates the actual engine torque Te at the time from the engine torque map (not shown) based on the engine revolution number and the throttle open degree obtained at S102 by the acquisition/determination unit 74 (S104).

Next, the acquisition/determination unit 74 obtains a vehicle speed of the vehicle 2 measured by the vehicle speed sensor 90 and gear stage information selected at the time by the transmission 5 (S106).

Next, the target torque ratio setting unit 71 calculates the speed ratio e in accordance with the engine revolution number obtained at S102 by the acquisition/determination unit 74 based on the vehicle speed obtained at S106 by the acquisition/determination unit 74 and the gear stage information selected at the time (S108).

Next, the target torque ratio setting unit 71 calculates the target torque ratio tt from the gear stage information selected at the time and obtained at S106 by the acquisition/determination unit 74 and the speed ratio e calculated at S108 based on the target torque ratio maps exemplified in FIG. 4. Then, the target torque ratio setting unit 71 calculates the allowable torque Tmax in accordance with the gear stage information selected at the time and obtained at S106 by the acquisition/determination unit 74 based on the not shown allowable torque map as well as substitutes the allowable torque Tmax and the engine torque Te calculated at S104 into the expression (5) described above and thereafter corrects the target torque ratio tt calculated above so that the target torque ratio tt satisfies the expression (5) and finally sets the target torque ratio tt (S110).

Next, the target hydraulic pressure setting unit 72 substitutes the target torque ratio tt set at S110 by the target torque ratio setting unit 71 and the engine torque Te calculated at S104 by the target torque ratio setting unit 71 into the expression (14) described above and calculates the target piston pressure force Pt (S112).

Then, the target hydraulic pressure setting unit 72 calculates the target clutch engagement hydraulic pressure pt by substituting the target piston pressure force Pt calculated at S112 into expression (15) described above, and the hydraulic pressure control unit 73 controls the hydraulic pressure control unit 60 as a clutch control and outputs an instruction of supply or discharge of the working oil to or from the piston hydraulic pressure chamber 34 or the working fluid flow path 33 so that the actual clutch engagement hydraulic pressure p is converged to the target clutch engagement hydraulic pressure pt (S114), and thereby the hydraulic pressure control unit 73 changes the torque ratio t, finishes a control cycle at the time, and goes to a next control cycle.

When it is determined at S100 by the acquisition/determination unit 74 that the idle switch is in the ON state (S100: Yes), the target hydraulic pressure setting unit 72 sets the target clutch engagement hydraulic pressure pt to a clutch OFF hydraulic pressure poff at which the friction member 35 and the front cover inner wall surface 36 are placed in the non-engaged state, and the hydraulic pressure control unit 73 controls the hydraulic pressure control unit 60 as the clutch control and outputs an instruction for keeping the actual clutch engagement hydraulic pressure p at the clutch OFF hydraulic pressure poff (S116), and thereby the hydraulic pressure control unit 73 places the friction member 35 which constitutes the friction engagement section 32 and the front cover inner wall surface 36 in the non-engaged state, finishes a control cycle at the time, and goes to a next control cycle.

According to the torque converter 1 according to the embodiment of the present invention explained above, there are provided the fluid transmission mechanism 20 which can transmit the power transmitted to the front cover 10 to the output shaft 50 via the working oil, the lock-up clutch mechanism 30 which can transmit the power transmitted to the front cover 10 to the output shaft 50 via the friction engagement section 32, and the ECU 70 which can execute the torque ratio variable control that makes the torque ratio, which is a ratio of torque that is output from the output shaft 50 by adjusting the friction engagement state of the friction engagement section 32 and torque that is input to the front cover 10 variable when the fluid transmission mechanism 20 is in an operation state in which the fluid transmission mechanism 20 amplifies the torque input to the front cover 10 and outputs the torque from the output shaft 50.

Accordingly, the torque converter 1 can exhibit the ideal target performance in accordance with the operation state of the vehicle 2 and can realize the appropriate start performance by that the ECU 70 adjusts the friction engagement state of the friction engagement section 32 in accordance with the operation state of the vehicle 2 and the like and executes the torque ratio variable control which makes the torque ratio t in the overall torque converter 1 variable.

Further, according to the torque converter 1 according to the embodiment of the present invention explained above, the ECU 70 adjusts the friction engagement state of the friction engagement section 32 based on a target value of the torque ratio variable control which is set in accordance with the operation state of the vehicle 2 on which the fluid transmission mechanism 20 and the lock-up clutch mechanism 30 are mounted. Accordingly, the torque converter 1 can be set to the target torque ratio in accordance with the operation state of the vehicle 2 by that the friction engagement state of the friction engagement section 32 is adjusted based on the target value of the torque ratio variable control, here, based on the target torque ratio so that the actual torque ratio is converged to the target torque ratio.

Further, according to the torque converter 1 according to the embodiment of the present invention explained above, the ECU 70 changes the torque ratio in accordance with the allowable torque in the power transmission system to which the torque output from the output shaft 50 is transmitted. Accordingly, the torque converter 1 can prevent excessive torque from being output from the output shaft 50 by that the torque ratio is set in accordance with the power transmission system, here, in accordance with the allowable torque Tmax of the transmission 5. Further, since the torque converter 1 can prevent the excessive torque from being output and thus it is not necessary to reinforce the drive system more than necessary to cope with the excessive torque, a manufacturing cost of the torque converter 1 can be reduced.

Further, according to the torque converter 1 according to the embodiment of the present invention explained above, the power source which generates the power transmitted to the front cover 10 is the engine 3 which is supercharged by the supercharger which increases pressure of intake air of the intake path making use of an exhaust gas, and the ECU 70 changes the torque ratio in accordance with the supercharging delay of the engine 3. Accordingly, since the torque ratio is set in accordance with the supercharging delay of the engine 3, the torque converter 1 can suppress that start torque becomes insufficient regardless of the supercharging delay of the engine 3 and thus can suppress an occurrence of a limp at the time of start.

Further, according to the torque converter 1 according to the embodiment of the present invention explained above, the ECU 70 changes the torque ratio in accordance with the deviation between the target engine torque (target engine torque) which is assumed to be generated by the engine 3 when supercharging is executed without delay and the actual engine torque (actual engine torque) actually generated by the engine 3. Accordingly, during a period until a supercharged pressure reaches an appropriate magnitude from an operation start point of the supercharger of the engine 3, since the torque converter 1 can compensate for torque of the deviation between the target engine torque which is assumed when the supercharged pressure sufficiently acts and the actual engine torque by the torque amplified by the torque converter 1, the torque converter 1 can secure the start torque without deficiency and excess regardless of a supercharged state of the engine 3 and thus can secure good start performance at all times.

Further, according to the torque converter 1 according to the embodiment of the present invention explained above, the ECU 70 changes the torque ratio in accordance with the actual engine torque actually generated by the engine 3, the gear shift stage or the gear shift ratio of the transmission 5 to which the torque output from the output shaft 50 is transmitted, here, the gear stage (gear shift stage), and the speed ratio which is the ratio of the rotational speed of the output shaft 50 and the rotational speed of the front cover 10. Accordingly, since the torque converter 1 can set an appropriate torque ratio in accordance with the operation state of the vehicle 2 and handling of a driver based on the actual engine torque and a selected gear stage and speed ratio and, for example, can set a torque ratio in accordance with the supercharging delay of the engine 3 as well as in accordance with the allowable torque Tmax of the power transmission system, the torque converter 1 can suppress excessive torque and insufficient torque at the same time and thus can suppress an occurrence of excessive torque while securing the good start performance.

Further, according to the torque converter 1 according to the embodiment of the present invention explained above, the actual engine torque is calculated based on the throttle open degree of the engine 3 and an engine revolution number (engine revolution number) of the engine 3, and the speed ratio is calculated based on the gear shift stage or the gear shift ratio of the transmission 5, here, the gear stage (gear shift stage) and the vehicle speed of the vehicle 2. Accordingly, the torque converter 1 can set the appropriate torque ratio based on the throttle open degree, the engine revolution number, the gear stage (gear shift stage), the vehicle speed, and the like.

Further, according to the torque converter 1 according to the embodiment of the present invention explained above, the ECU 70 adjusts pressure of the working oil in the piston hydraulic pressure chamber 34 of the lock-up clutch mechanism 30 and eventually the clutch engagement hydraulic pressure p to thereby adjust the piston pressure force P which is the pressure force acting between the friction member 35 that is one friction surface constituting the friction engagement section 32 and the front cover inner wall surface 36 that is the other friction surface and adjusts the torque ratio by adjusting the slip amount between the friction member 35 and the front cover inner wall surface 36. Accordingly, the torque converter 1 can adjust a magnitude of the torque transmitted to the output shaft 50 via the friction engagement section 32 by a simple control for adjusting the clutch engagement hydraulic pressure p and can changes the torque ratio t in the overall torque converter 1.

Note that, in the torque converter 1 explained above, the ECU 70 as the control unit may set a change speed of the clutch engagement hydraulic pressure p that is pressure of the working oil in accordance with the deviation between the target torque ratio tt that is the target torque ratio in the torque ratio variable control and the actual torque ratio t. When, for example, the deviation between the target torque ratio tt and the actual torque ratio t is relatively large, that is, when, for example, a deviation between the target engine torque which is assumed to be generated to the engine 3 at the time supercharging is executed without delay and the actual engine torque actually generated by the engine 3 is relatively large, the ECU 70 sets the change speed of the clutch engagement hydraulic pressure p relatively large. In contrast, when the deviation between the target torque ratio tt and the actual torque ratio t is relatively small, that is, when, for example, the deviation between the target engine torque and the actual engine torque is relatively small, the ECU 70 sets the change speed the clutch engagement hydraulic pressure p relatively small. With the operation, when, for example, the deviation between the target torque ratio tt and the actual torque ratio t is large, the torque converter 1 can converge the actual torque ratio t to the target torque ratio tt with a good following capability at an early time as well as when the deviation between the target torque ratio tt and the actual torque ratio t is small, the torque converter 1 can prevent the actual torque ratio t from overshooting to the target torque ratio tt and thus can more reliably suppress excessive torque and insufficient torque at the same time.

Second Embodiment

Figure 9:
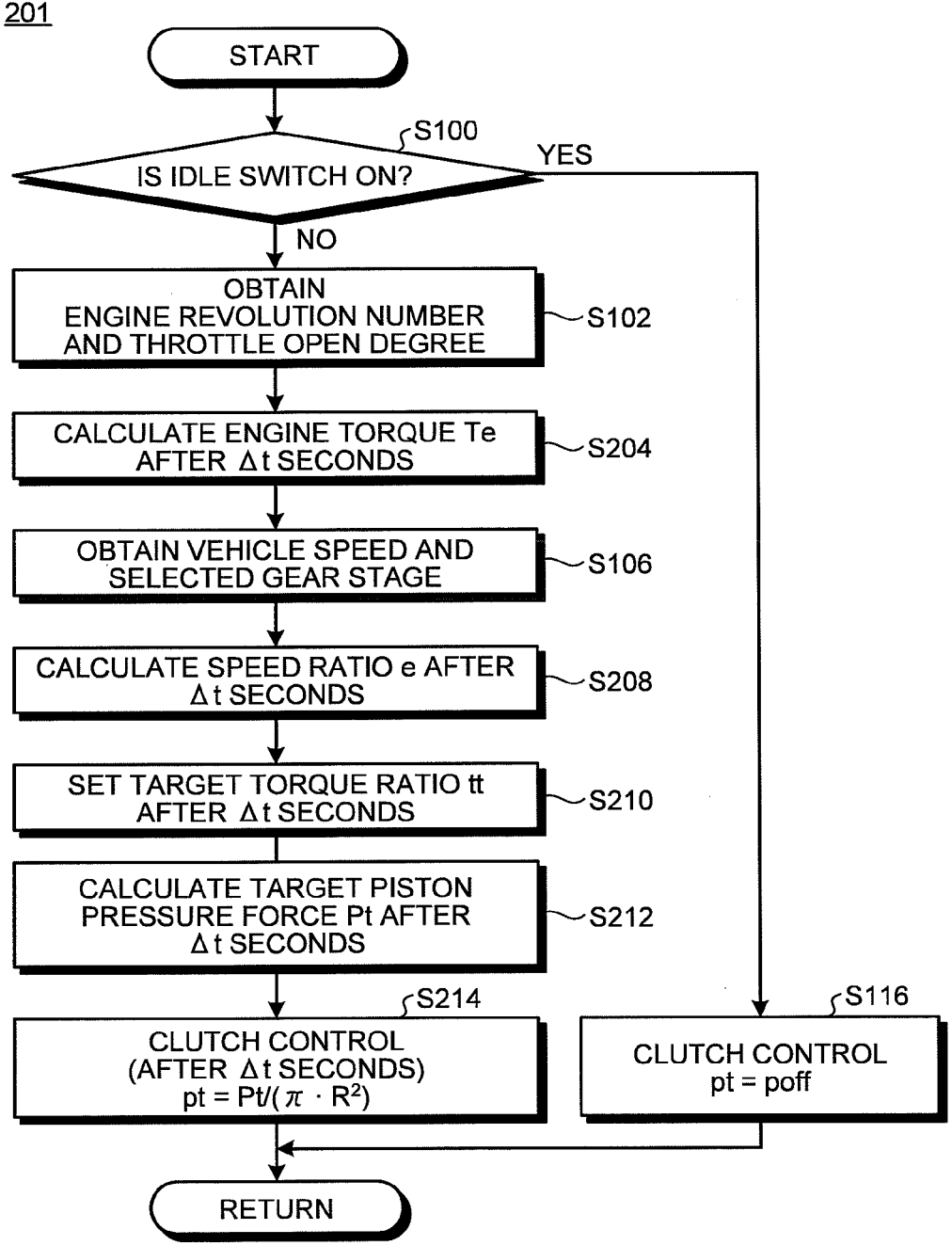
FIG. 9 is a flowchart explaining a torque ratio variable control of a torque converter according to a second embodiment of the present invention.

FIG. 9 is a flowchart explaining a torque ratio variable control of a torque converter according to a second embodiment of the present invention. Although a fluid transmission device according to the second embodiment has approximately the same configuration as the fluid transmission device according to the first embodiment, the fluid transmission device is different from the fluid transmission device according to the first embodiment in that a torque ratio is changed based on a prediction. In addition to the above-mentioned, as to a configuration, an operation, and an effect common to those of the embodiment described above, a duplicate explanation is omitted as much as possible as well as same reference numerals are attached. Further, as to respective configurations of the fluid transmission device according to the second embodiment, FIG. 1 and the like will be referred to.

In a torque converter 201 as the fluid transmission device according to the embodiment, the ECU 70 as a control unit sets a hydraulic pressure of a working oil in the piston hydraulic pressure chamber 34 and eventually a clutch engagement hydraulic pressure p in accordance with a response delay of a hydraulic pressure of the working oil (pressure of an working medium) in a hydraulic pressure control system including a hydraulic pressure control unit 60 and various oil paths. Here, the ECU 70 predicts a state of the engine 3 in accordance with a response delay time of the hydraulic pressure of the working oil in the hydraulic pressure control system, previously reads and sets a control value in a torque ratio variable control, and executes the torque ratio variable control at a timing in accordance with a state of the engine 3.

Specifically, the ECU 70 predicts the state of the engine 3 after a predetermined time based on a throttle open degree and an engine revolution number of the engine 3, sets the clutch engagement hydraulic pressure p which reflects the response delay of the hydraulic pressure of the working oil in the hydraulic pressure control system in accordance with the predicted state of the engine 3, and changes a torque ratio t. That is, the ECU 70 sets a target value of the torque ratio variable control based on an engine revolution number, a throttle open degree, a change amount per unit time of them, and the like at the time of transient start drive in a feedforward control manner. Here, the predetermined time is a time in accordance with the response delay time of the hydraulic pressure control system which changes in accordance with an oil temperature of the working oil and the operation state of the vehicle 2 including the torque converter 201 and the engine 3 and is calculated from a not shown hydraulic pressure response delay map in accordance with various parameters showing, for example, the oil temperature of the working oil and the operation state of the vehicle 2.

Next, an example of the torque ratio variable control of the torque converter 201 according to the embodiment will be explained referring to a flowchart FIG. 9. Note that an explanation of steps similar to those of the torque converter 1 of the first embodiment are omitted as much as possible also here.

After the acquisition/determination unit 74 obtains the engine revolution number and the throttle open degree (S102), the target torque ratio setting unit 71 calculates a predetermined time $\Delta t$ in accordance with the response delay time of the hydraulic pressure from the not shown hydraulic pressure response delay map in accordance with the various parameters showing the oil temperature of the working oil and the operation state of the vehicle 2 including the torque converter 201 and the engine 3. Then, the target torque ratio setting unit 71 predictively calculates an engine revolution number after a predetermined time of $\Delta t$ seconds based on the engine revolution number, the throttle open degree, the change amount per unit time of them, and the like obtained by the acquisition/determination unit 74 and predictively calculates an actual engine torque Te after $\Delta t$ seconds from an engine torque map (not shown) (S204).

Further, after the acquisition/determination unit 74 obtains a vehicle speed and gear stage information selected at the time (S106), the target torque ratio setting unit 71 predictively calculates a speed ratio e after the predetermined time of $\Delta t$ seconds in accordance with the engine revolution number after the predetermined time of $\Delta t$ seconds based on the vehicle speed and the gear stage information selected at the time which are obtained by the acquisition/determination unit 74 (S208).

Then, the target torque ratio setting unit 71 sets a target torque ratio tt after Δt seconds based on the gear stage information selected at the time, the speed ratio e after the predetermined time of Δt seconds, the actual engine torque Te after Δt seconds, and the like (S210).

Next, the target hydraulic pressure setting unit 72 substitutes the target torque ratio tt after Δt seconds set at S210 by the target torque ratio setting unit 71 and the engine torque Te after Δt seconds calculated at S204 by the target torque ratio setting unit 71 into the expression (14) described above and calculates a target piston pressure force Pt after Δt seconds (S212).

Then, the target hydraulic pressure setting unit 72 substitutes the target piston pressure force Pt after Δt seconds calculated at S212 into the expression (15) described above and calculates the target clutch engagement hydraulic pressure pt after Δt seconds in accordance with the response delay of the hydraulic pressure of the working oil in the hydraulic pressure control system, and the hydraulic pressure control unit 73 controls the hydraulic pressure control unit 60 as a clutch control and outputs an instruction of a supply or a discharge of the working oil to or from the piston hydraulic pressure chamber 34 or the working fluid flow path 33 so that the actual clutch engagement hydraulic pressure p after the predetermined time of Δt seconds is converged to the target clutch engagement hydraulic pressure pt after Δt seconds (S214) to thereby change the torque ratio t, finish a control cycle at the time, and go to a next control cycle.

According to the torque converter 201 according to the embodiment of the present invention explained above, since the ECU 70 adjusts a friction engagement state of the friction engagement section 32 in accordance with the operation state of the vehicle 2 and the like and executes the torque ratio variable control which makes the torque ratio t in the overall torque converter 201 variable, the torque converter 201 can exhibit ideal target performance in accordance with the operation state of the vehicle 2 and can realize appropriate start performance.

Further, according to the torque converter 201 according to the embodiment of the present invention explained above, the ECU 70 predicts a state of the engine 3 after a predetermined time based on the throttle open degree of the engine 3 and the engine revolution number and changes the torque ratio in accordance with the predicted state of the engine 3. Accordingly, the torque converter 201 can execute an appropriate torque ratio variable control corresponding to a change of state of the engine 3 and can obtain the appropriate start performance as well as even when, for example, the state of the engine 3 is abruptly changed by abrupt handling of a driver, the torque converter 201 can reliably prevent excessive torque from being output from the torque converter 201.

Further, according to the torque converter 201 according to the embodiment of the present invention explained above, the ECU 70 sets pressure of the working oil of the piston hydraulic pressure chamber 34 and eventually the clutch engagement hydraulic pressure in accordance with the response delay of the hydraulic pressure of the working oil. Accordingly, the torque converter 201 can execute an appropriate torque ratio variable control in view of the response delay of the hydraulic pressure of the working oil in the hydraulic pressure control system and can obtain the appropriate start performance as well as even when, for example, the state of the engine 3 is abruptly changed by the abrupt handling of the driver, the torque converter 201 can reliably prevent the excessive torque from being output from the torque converter 201.

Note that, in the torque converter 201 explained above, the ECU 70 control unit may set the pressure of the working oil of the piston hydraulic pressure chamber 34, the clutch engagement hydraulic pressure, and eventually the torque ratio in accordance with the response delay of the hydraulic pressure of the working oil by calculating a hydraulic pressure delay coefficient from a not shown hydraulic pressure delay coefficient map in accordance with the various parameters showing the oil temperature of the working oil and the operation state of the vehicle 2 including the torque converter 201 and the engine 3 and multiplying the hydraulic pressure delay coefficient by the target torque ratio tt, the target clutch engagement hydraulic pressure pt, or the target piston pressure force Pt. Even in the case, the torque converter 201 can execute the appropriate torque ratio variable control in view of the response delay of the hydraulic pressure of the working oil in the hydraulic pressure control system and can obtain the appropriate start performance as well as can reliably prevent the excessive torque from being output from the torque converter 201.

Third Embodiment

Figure 10:
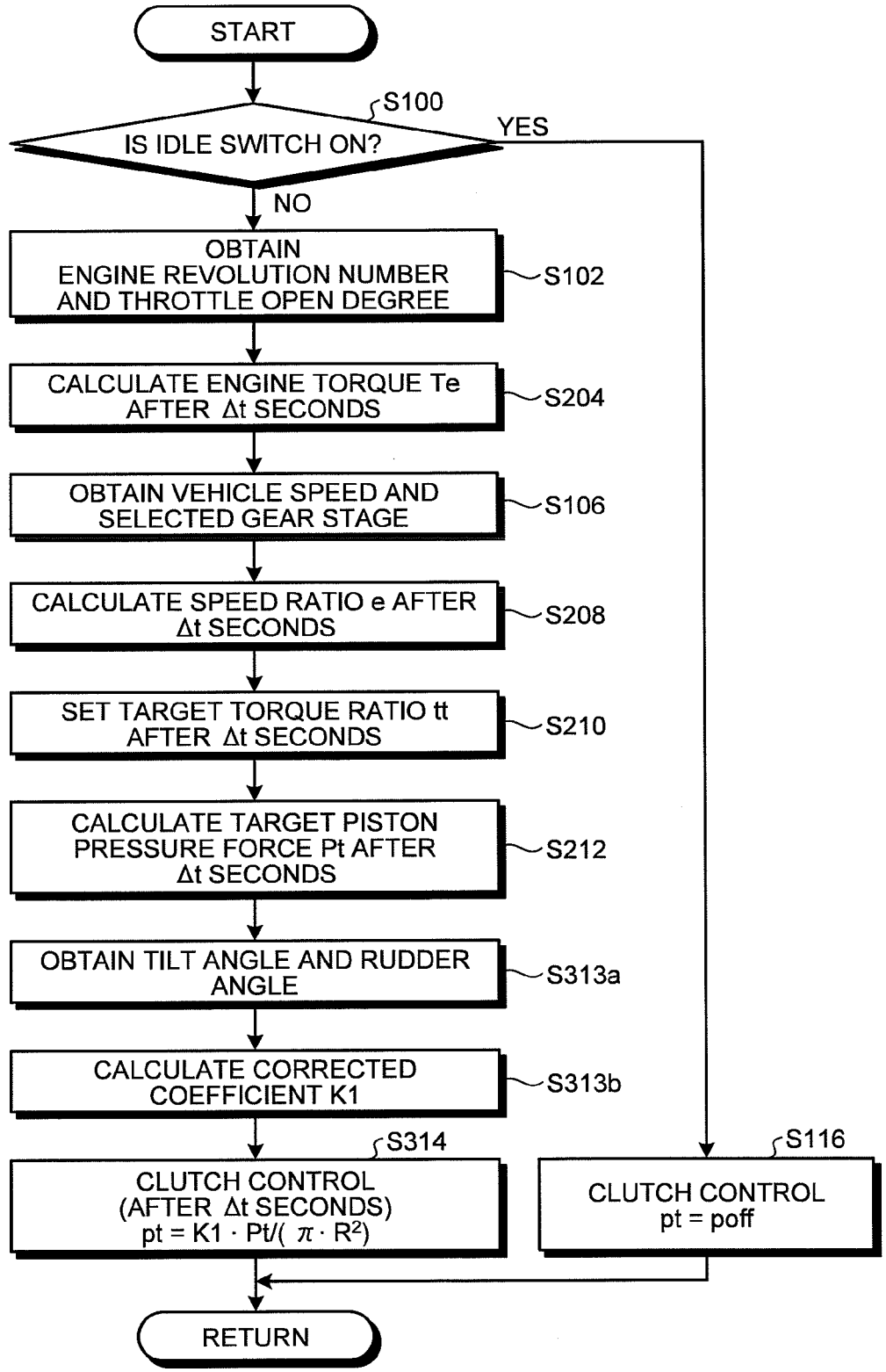
FIG. 10 is a flowchart explaining a torque ratio variable control of a torque converter according to a third embodiment of the present invention.

FIG. 10 is a flowchart explaining a torque ratio variable control of a torque converter according to a third embodiment of the present invention. Although a fluid transmission device according to the third embodiment has approximately the same configuration as the fluid transmission device according to the second embodiment, the fluid transmission device is different from the fluid transmission device according to the second embodiment in that a torque ratio is changed based on a tilt angle or a rudder angle. In addition to the above-mentioned, as to a configuration, an operation, and an effect common to those of the embodiments described above, a duplicate explanation will be omitted as much as possible as well as same reference numerals are attached. Further, as to respective configurations of the fluid transmission device according to the third embodiment, FIG. 1 and the like will be referred to.

A torque converter 301 as the fluid transmission device according to the embodiment changes the torque ratio by an ECU 70 as a control unit in accordance with a tilt angle of a road surface on which the vehicle 2 positions or a rudder angle of the vehicle 2.

The ECU 70 obtains the tilt angle of the road surface on which the vehicle 2 is positioned that is, a road surface gradient detected by a tilt angle sensor 93 (refer to FIG. 1). Further, the ECU 70 obtains the rudder angle of the vehicle 2 detected by a rudder angle sensor 94 (refer to FIG. 1). The rudder angle sensor 94 detects the rudder angle of the vehicle 2 based on, for example, a rudder angle of a steering wheel of a steering device and on a turning angle of the steering wheel of the vehicle 2. Note that the ECU 70 may obtain road surface gradient information (map information) which is information showing the road surface gradient using, for example, a navigation system and a GPS (global positioning system) receiver in place of the tilt angle sensor 93, and may detect the road surface gradient of the road surface on which the vehicle 2 is positioned based on the road surface gradient information.

Specifically, the ECU 70 sets the torque ratio t to a relatively large value on a side where the tilt angle of the road surface on which the vehicle 2 is positioned is relatively large and sets the torque ratio t to a relatively small value on a side where the tilt angle is relatively small. Further, the ECU 70 sets the torque ratio t to a relatively large value on a side where the rudder angle of the vehicle 2 at the time is relatively large and sets the torque ratio t to a relatively small value on a side whereas the rudder angle is relatively small. With the operation, when a relatively large amount of start torque is requested at the time of starting on a steep hill, a corner, and the like, the torque converter 301 can suppress start torque from becoming insufficient as well as when a start can be made well with a relatively small amount of torque at the time of starting on a flat road, a straight road, and the like, the torque converter 301 can suppress a generation of extra start torque.

Next, an example of the torque ratio variable control of the torque converter 301 according to the embodiment will be explained referring to the flowchart of FIG. 10. Note that, also here, an explanation of steps similar to those of the torque converters 1, 201 of the embodiments 1, 2 are omitted as much as possible.

After the target hydraulic pressure setting unit 72 calculates a target piston pressure force Pt after Δt seconds (S212), the acquisition/determination unit 74 obtains the tilt angle of the road surface on which the vehicle 2 is positioned and the rudder angle of the vehicle 2 measured by the tilt angle sensor 93 and the rudder angle sensor 94 (S313a).

Next, the target hydraulic pressure setting unit 72 calculates a correction coefficient K1 based on the tilt angle of the road surface on which the vehicle 2 is positioned and the rudder angle of the vehicle 2 obtained at S313a by the acquisition/determination unit 74 (S313b). The target hydraulic pressure setting unit 72 calculates the correction coefficient K1 in accordance with the tilt angle the road surface on which the vehicle 2 is positioned and the rudder angle of the vehicle 2 from, for example, a not shown correction coefficient map.

Next, the target hydraulic pressure setting unit 72 substitutes the target piston pressure force Pt after Δt seconds calculated at S212 and the correction coefficient K1 calculated at S313b into the following expression (16) and calculates a target clutch engagement hydraulic pressure pt after Δt seconds corrected in accordance with the tilt angle of the road surface on which the vehicle 2 is positioned the rudder angle of the vehicle 2. The hydraulic pressure control unit 73 controls a hydraulic pressure control unit 60 as a clutch control and outputs an instruction of a supply or a discharge of the working oil to or from the piston hydraulic pressure chamber 34 or the working fluid flow path 33 so that the actual clutch engagement hydraulic pressure p after a predetermined time of Δt seconds is converged to the target clutch engagement hydraulic pressure pt after Δt seconds corrected in accordance with the tilt angle of the road surface on which the vehicle 2 is positioned and the rudder angle of the vehicle 2 (S314) to thereby change the torque ratio t, finish a control cycle at the time, and go to a next control cycle.

$$p = K1 \cdot P/(\pi \cdot R^2) \quad (16)$$

According to the torque converter 301 according to the embodiment of the present invention explained above, the torque converter 301 can exhibit an ideal target performance in accordance with an operation state of the vehicle 2 and realize an appropriate start performance by that the ECU 70 adjusts a friction engagement state of a friction engagement section 32 in accordance with the operation state of the vehicle 2 and the like and executes the torque ratio variable control which makes the torque ratio t in the overall torque converter 301 variable.

Further, according to the torque converter 301 according to the embodiment of the present invention explained above, the ECU 70 changes the torque ratio t in accordance with the tilt angle of the road surface on which the vehicle 2 on which the fluid transmission mechanism 20 and the lock-up clutch mechanism 30 are mounted is positioned or with the rudder angle of the vehicle 2. Accordingly, when a relatively large amount of start torque is requested, the torque converter 301 can suppress the start torque from become insufficient as well as when a start can be made well with a relatively small amount of torque, the torque converter 301 can suppress a generation of extra torque, and thereby the torque converter 301 can improve a fuel economy and maneuvering stability at the same time.

Note that, in the torque converter 301 explained above, the ECU 70 as the control unit may be configured to change the torque ratio t in accordance with the tilt angle and the rudder angle by, for example, multiplying the correction coefficient K1 in accordance with the tilt angle of the road surface on which the vehicle 2 is positioned and the rudder angle of the vehicle 2 by the target torque ratio tt.

Fourth Embodiment

Figure 11:
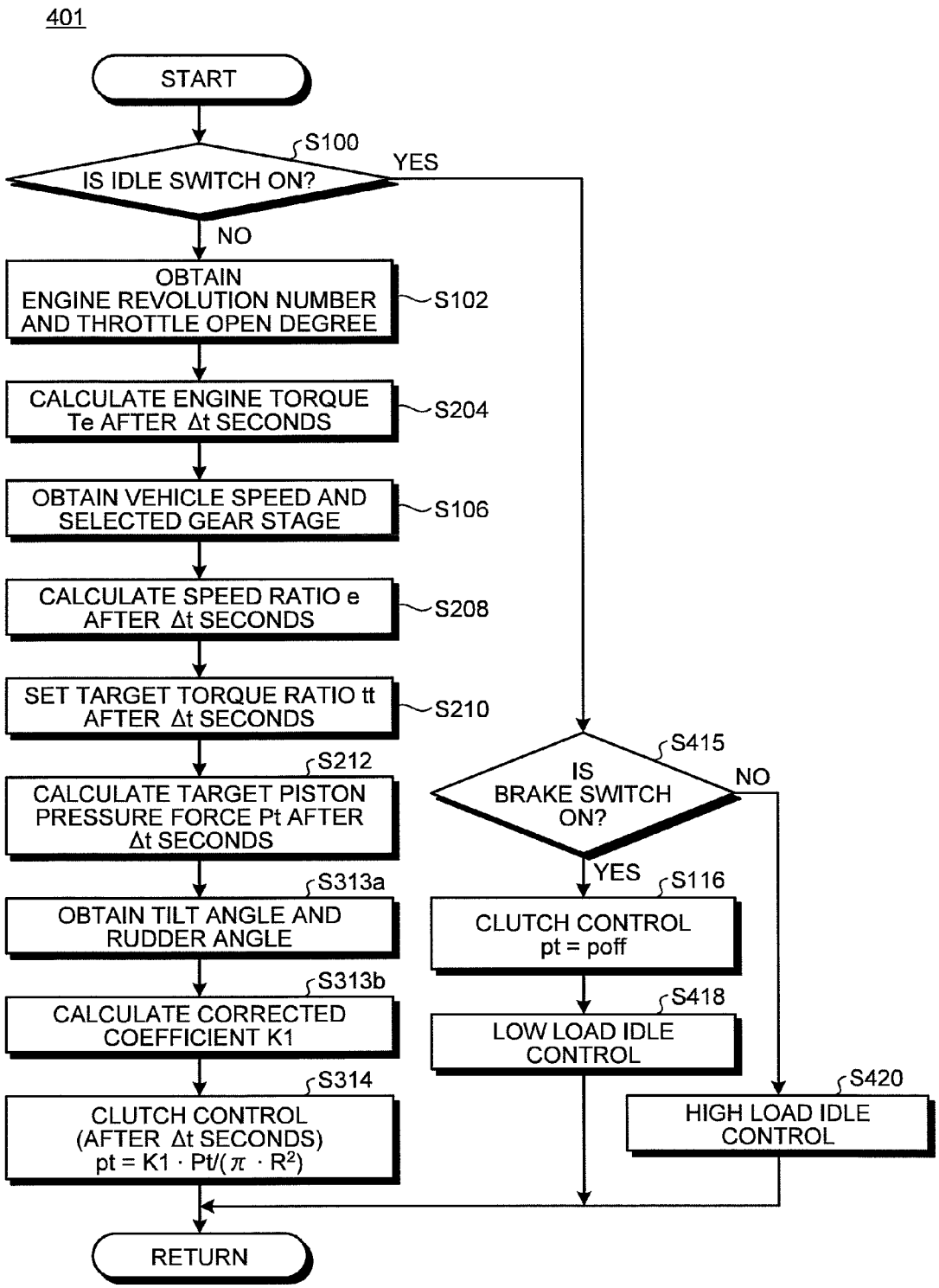
FIG. 11 is a flowchart explaining a torque ratio variable control of a torque converter according to a fourth embodiment of the present invention.

FIG. 11 is a flowchart explaining a torque ratio variable control of a torque converter according to a fourth embodiment of the present invention. Although the fluid transmission device according to the fourth embodiment is configured approximately similar to the fluid transmission device according to the third embodiment, the fluid transmission device is different from the fluid transmission device according to the third embodiment in that idle controls are switched in accordance with an operation state. In addition to the above-mentioned, as to a configuration, an operation, and an effect common to those of the embodiments described above, a duplicate explanation is omitted as much as possible as well as same reference numerals are attached. Further, as to respective configurations of the fluid transmission device according to the fourth embodiment, FIG. 1 and the like will be referred to.

In a torque converter 401 as a fluid transmission device according to the embodiment, an ECU 70 as a control unit switches and executes plural types of the idle controls in accordance with an operation state of a vehicle 2. The ECU 70 selectively uses a low load idle control which sets a load of an engine 3 relatively low and a high load idle control which sets the load of the engine 3 relatively high depending on a status.

Specifically, when it is predicted that a stop state of the vehicle 2 continues, the ECU 70 relatively lowers the load of the engine 3 in comparison with a case that a start of the vehicle 2 is predicted after placing a friction engagement section 32 in a non-engaged state. That is, when it is predicted that the stop state of the vehicle 2 continues, that is, when it is determined, for example, that an idle switch is in an ON state as well as a not shown brake operating member is operated by a driver and a brake switch 95 (refer to FIG. 1) is in an ON state, the ECU 70 places the friction engagement section 32 in the non-engaged state and executes the low load idle control which sets the load of the engine 3 relatively low. In contrast, when the start of the vehicle 2 is predicted, that is, when it is determined, for example, that the brake switch 95 is in an OFF state, the ECU 70 executes the high load idle control which sets the load of the engine 3 relatively high.

When it is predicted that the stop state of the vehicle 2 continues, since an apparent torque capacity in the overall torque converter 401 is reduced by that the friction engagement section 32 is placed in the non-engaged state, no misfire and the like occur even if the torque converter 401 reduces a fuel injection amount of the engine 3 and sets the load of the engine 3 relatively low. Accordingly, when it is predicted that the stop state of the vehicle 2 continues, the torque converter 401 can improve a fuel consumption at the time of idle operation by placing the friction engagement section 32 in the non-engaged state and executing the low load idle control. Note that, when the start of the vehicle 2 is predicted, the torque converter 401 can also generate appropriate creep torque by executing the high load idle control and placing the friction engagement section 32 in a semi-engaged state when necessary.

Next, an example of the torque ratio variable control of the torque converter 401 according to the embodiment will be explained referring to a flowchart of FIG. 11. Note that, also here, an explanation of steps similar to those of the torque converters 1, 201, and 301 of the first, second and third embodiments is omitted as much as possible.

when the acquisition/determination unit 74 determines at S100 that the idle switch is in the ON state (S100: Yes), the acquisition/determination unit 74 determines whether or not the brake switch 95 is in an ON state (S415).

When it is determined by the acquisition/determination unit 74 that the brake switch 95 is in the ON state (S415: Yes), a target hydraulic pressure setting unit 72 sets a target clutch engagement hydraulic pressure pt to a clutch OFF hydraulic pressure poff at which the friction member 35 and the front cover inner wall surface 36 are placed in the non-engaged state, and the hydraulic pressure control unit 73 controls a hydraulic pressure control unit 60 as a clutch control, and outputs an instruction for keeping an actual clutch engagement hydraulic pressure p at the clutch OFF hydraulic pressure poff (S116), and thereby the hydraulic pressure control unit 73 places the friction member 35 which constitutes the friction engagement section 32 and the front cover inner wall surface 36 in the non-engaged state.

Then, when the acquisition/determination unit 74 which functions also as an idle control unit executes (or continues) the low load idle control which sets the load of the engine 3 relatively low (S418), finishes a control cycle at the time, and goes to a next control cycle.

When the acquisition/determination unit 74 which functions also the idle control unit determines at S415 that the brake switch 95 is in the OFF state (S415: No), the acquisition/determination unit 74 executes (or continues) the high load idle control which sets the load of the engine 3 relatively high (S420), finishes the control cycle at the time, and goes to the next control cycle.

Note that although an explanation is made here assuming that the acquisition/determination unit 74 functions also as the idle control unit, the idle control unit may be provided independently of the acquisition/determination unit 74.

According to the torque converter 401 according to the embodiment of the present invention explained above, since the ECU 70 executes the torque ratio variable control which adjusts the friction engagement state of the friction engagement section 32 in accordance with the operation state of the vehicle 2 and the like and makes the torque ratio t in the overall torque converter 401 variable, the torque converter 401 can exhibit an ideal target performance in accordance with the operation state of the vehicle 2 and can realize an appropriate start performance.

Further, according to the torque converter 401 according to the embodiment of the present invention explained above, when it is predicted that the stop state of the vehicle 2 on which a fluid transmission mechanism 20 and a lock-up clutch mechanism 30 are mounted continues, the ECU 70 places the friction engagement section 32 in the non-engaged state and relatively lowers the load of the engine 3 which is a power source that generates power transmitted to the front cover 10 in comparison with the case that the start of the vehicle 2 is predicted. Accordingly, the torque converter 401 can improves a fuel consumption in an idle operation while preventing a misfire and the like of the engine 3.

Note that the fluid transmission device according to the embodiment of the present invention described above is not limited to the embodiments described above and can be variously changed in a range described claims. The fluid transmission device according to the embodiment of the present invention may be configured by combining plural embodiments explained above.

In the above explanation, although the lock-up clutch section is explained assuming that it is composed of the friction member 35 in which the friction engagement section 32 is disposed to the lock-up piston 31 as the engagement member and the front cover inner wall surface 36 of the front cover 10 as the input member, the lock-up clutch section may be configured such that the friction member 35 is disposed to the front cover inner wall surface 36 and the friction engagement section 32 is composed of a wall surface, which confronts the friction member 35 in the lock-up piston 31 in the axial direction, and the friction member 35.

In the above explanation, although the lock-up clutch section is explained assuming that it approaches and is away from the front cover 10 and can be friction-engaged with the front cover 10 via the friction engagement section 32 by that the lock-up piston 31 as the engagement member is relatively movably supported along the axial direction with respect to the damper mechanism 40, the lock-up clutch section is not limited thereto. For example, the lock-up piston 31 of the lock-up clutch section may be configured such that it can be friction-engaged via the friction engagement section 32 by that the overall damper mechanism 40 is relatively movably supported along the axial direction with respect to the hub 51 and thus the overall damper mechanism 40 approaches and is away from the front cover 10 in its entirety. Further, although the lock-up clutch section is explained assuming that it is interposed between the front cover 10 and the damper mechanism 40 with respect to the axial direction, the lock-up clutch section is not limited thereto.

Further, the fluid transmission device explained above preferably has a configuration which improves heat durability of the friction engagement section 32 by relatively increasing an area of a friction surface that constitutes the friction engagement section 32, composing the friction engagement section 32 of plural plates, and the like.

In the above explanation, although the control unit is explained assuming that it adjusts the pressure force acting between one friction surface and the other friction surface which constitute the friction engagement section by adjusting pressure of the working fluid in the hydraulic pressure chamber of the lock-up clutch section, the control unit is not limited thereto and may adjust the pressure force by, for example, an electrically driven actuator. In the case, it is sufficient that the control unit finally adjusts the torque ratio by adjusting a current amount supplied to the electrically driven actuator based on the target value in the torque ratio variable control.

A setting method of the target torque ratio tt explained above is not limited to the above method. The control unit may set the target torque ratio tt in accordance with the allowable torque in the power transmission system as well as in accordance with the supercharging delay of the engine 3 and may change the torque ratio t based on the target torque ratio tt by actually calculating a deviation between the target engine torque (target engine torque), which is assumed to be generated by the engine 3 when supercharging is executed without a supercharging delay and the actual engine torque (actual engine torque) which is actually generated by the engine 3 based on detection signals of the various sensors without using the maps exemplified in FIG. 4 and setting the target torque ratio tt in accordance with the deviation and the allowable torque.

In the above explanation, although it is explained assuming that the target value of the torque ratio variable control is the target torque ratio tt as a torque ratio of a target, the target value is not limited thereto and may be the target clutch engagement hydraulic pressure pt which is the clutch engagement hydraulic pressure of the target and the target piston pressure force Pt which is the piston pressure force of the target. Note that it is substantially the same as that the target torque ratio tt is changed in accordance with the operation state of the vehicle 2 and the like to change the target clutch engagement hydraulic pressure pt and the target piston pressure force Pt in accordance with the operation state of the vehicle 2 and the like.

INDUSTRIAL APPLICABILITY

As described above, the fluid transmission device according to the present invention can realize appropriate start performance and is preferably used to various fluid transmission devices which can transmit power generated by a power source via a working fluid.

REFERENCE SIGNS LIST 1, 201, 301, 401 TORQUE CONVERTER (FLUID TRANSMISSION DEVICE)
2 VEHICLE
3 ENGINE (POWER SOURCE, INTERNAL COMBUSTION ENGINE)
5 TRANSMISSION (POWER TRANSMISSION SYSTEM)
10 FRONT COVER (INPUT MEMBER)
20 FLUID TRANSMISSION MECHANISM (FLUID TRANSMISSION SECTION)
21 PUMP IMPELLER
22 TURBINE LINER
23 STATOR
24 ONE WAY CLUTCH
30 LOCK-UP CLUTCH MECHANISM (LOCK-UP CLUTCH SECTION)
31 LOCK-UP PISTON
31c PRESSURE RECEIVING SURFACE
32 FRICTION ENGAGEMENT SECTION
34 PISTON HYDRAULIC PRESSURE CHAMBER (HYDRAULIC PRESSURE CHAMBER)
35 FRICTION MEMBER (FRICTION SURFACE)
36 FRONT COVER INNER WALL SURFACE (FRICTION SURFACE)
40 DAMPER MECHANISM
50 OUTPUT SHAFT (OUTPUT MEMBER)
60 HYDRAULIC PRESSURE CONTROL UNIT
70 ECU (CONTROL UNIT)
80 DRIVE PLATE
X ROTATION AXIS

The invention claimed is:

1. A fluid transmission device comprising:
a torque converter configured to include an input member connected to an internal combustion engine which is supercharged by a supercharger, a fluid transmission section capable of transmitting power transmitted to the input member to an output member via a working fluid, and a lock-up clutch section capable of transmitting power transmitted to the input member to the output member via a friction engagement section; and
a control unit configured to execute a torque ratio variable control that makes a torque ratio in the overall torque converter which is a ratio between torque output from the output member and torque input to the input member variable by adjusting a friction engagement state of the friction engagement section, at the timing a vehicle on which the torque converter is mounted starts; and
a target torque ratio setting unit configured to calculate a target value of the torque ratio in the overall torque converter in a range which is equal to or less than a torque ratio of the fluid transmission section as well as equal to or more than 1 in accordance with a deviation between target engine torque that is assumed to be generated by the internal combustion engine when a supercharging is executed without a supercharging delay and actual engine torque actually generated by the internal combustion engine, wherein
the target torque ratio setting unit corrects the target value so that the target value becomes equal to or less than an allowable torque in a power transmission system to which the torque output from the output member is transmitted,
the control unit adjusts the friction engagement state of the friction engagement section based on the target value at a timing the torque ratio of the fluid transmission section is more than 1.

2. The fluid transmission device according to claim 1, wherein the target torque ratio setting unit changes the target value in accordance with an allowable torque in a power transmission system to which the torque output from the output member is transmitted.

3. The fluid transmission device according to claim 1, wherein
a power source that generates power transmitted to the input member is the internal combustion engine that is supercharged by the supercharger which increases pressure of intake air of an intake path making use of an exhaust gas; and
the target torque ratio setting unit changes the target value in accordance with a supercharging delay.

4. The fluid transmission device according to claim 3, wherein the target torque ratio setting unit changes the target value in accordance with a deviation between target engine torque that is assumed to be generated by the internal combustion engine when the supercharging is executed without the supercharging delay and actual engine torque actually generated by the internal combustion engine.

5. The fluid transmission device according to claim 1, wherein
a power source that generates power transmitted to the input member is the internal combustion engine that is supercharged by the supercharger which increases pressure of intake air of an intake path making use of an exhaust gas; and
the target torque ratio setting unit changes the target value in accordance with actual engine torque actually generated by the internal combustion engine, a gear shift stage or a gear shift ratio of a transmission to which torque output from the output member is transmitted, and a speed ratio which is a ratio between a rotational speed of the output member and a rotational speed of the input member.

6. The fluid transmission device according to claim 5, wherein the actual engine torque is calculated based on a throttle open degree of the internal combustion engine and an engine revolution number of the internal combustion engine; and the speed ratio is calculated based on the gear shift stage or the gear shift ratio and a vehicle speed of the vehicle on which the fluid transmission section and the lock-up clutch section are mounted.

7. The fluid transmission device according to claim 1, wherein a power source that generates power transmitted to the input member is an internal combustion engine; and the target torque ratio setting unit predicts a state of the internal combustion engine after a predetermined time based on a throttle open degree and an engine revolution number of the internal combustion engine, and changes the target value in accordance with the predicted state of the internal combustion engine.

8. The fluid transmission device according to claim 1, wherein the target torque ratio setting unit changes the target value in accordance with a tilt angle of a road surface on which the vehicle on which the fluid transmission section and the lock-up clutch section are mounted is positioned, or with a rudder angle of the vehicle.

9. The fluid transmission device according to claim 1, wherein the control unit adjusts a pressure force acting between one friction surface and the other friction surface which constitute the friction engagement section by adjusting pressure of the working fluid in a hydraulic pressure chamber of the lock-up clutch section, adjusts a slip amount between the one friction surface and the other friction surface, and adjusts the torque ratio.

10. The fluid transmission device according to claim 9, wherein the control unit sets a change speed of the pressure of the working fluid in accordance with a deviation between the target value and an actual torque ratio.

11. The fluid transmission device according to claim 9, wherein the control unit sets the pressure of the working fluid in accordance with a response delay of the pressure of the working fluid.

12. The fluid transmission device according to claim 1, wherein when it is predicted that a stop state of the vehicle on which the fluid transmission section and the lock-up clutch section are mounted continues, the control unit places the friction engagement section in a non-engaged state and relatively lowers a load of a power source which generates power transmitted to the input member in comparison with a case that a start of the vehicle is predicted.

13. The fluid transmission device according to claim 1, wherein the control unit reduces a pressure force which adjusts the friction engagement state of the friction engagement section so as to increase the torque ratio and increases the pressure force so as to reduce the torque ratio.

14. The fluid transmission device according to claim 1, wherein the torque ratio setting unit sets the target value to a large value at the timing that a large drive torque is required.

* * * * *